(12) United States Patent
Yamamoto et al.

(10) Patent No.: US 9,013,069 B2
(45) Date of Patent: Apr. 21, 2015

(54) POWER GENERATION SYSTEM AND POWER GENERATING UNIT

(75) Inventors: Hiroshi Yamamoto, Osaka (JP); Hiroshi Kanno, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 750 days.

(21) Appl. No.: 13/267,090

(22) Filed: Oct. 6, 2011

(65) Prior Publication Data

US 2012/0086283 A1 Apr. 12, 2012

Related U.S. Application Data

(60) Provisional application No. 61/391,286, filed on Oct. 8, 2010.

(51) Int. Cl.
*H02J 17/00* (2006.01)

(52) U.S. Cl.
CPC ...................................... *H02J 17/00* (2013.01)

(58) Field of Classification Search
CPC .......................................................... H02J 17/00
USPC ......................................................... 307/104
See application file for complete search history.

(56) References Cited

U.S. PATENT DOCUMENTS

| | | | |
|---|---|---|---|
| 3,710,329 A * | 1/1973 | Mailloux et al. | 342/373 |
| 5,473,528 A | 12/1995 | Hirata et al. | |
| 6,169,678 B1 * | 1/2001 | Kondo et al. | 363/71 |
| 2003/0117864 A1 | 6/2003 | Hampel et al. | |
| 2005/0132158 A1 * | 6/2005 | Hampel et al. | 711/167 |
| 2007/0252574 A1 * | 11/2007 | Breuer et al. | 323/325 |
| 2008/0278264 A1 | 11/2008 | Karalis et al. | |
| 2009/0003022 A1 | 1/2009 | Nunoya et al. | |
| 2009/0206666 A1 * | 8/2009 | Sella et al. | 307/43 |
| 2009/0207000 A1 * | 8/2009 | Mickle et al. | 340/10.34 |

(Continued)

FOREIGN PATENT DOCUMENTS

| | | |
|---|---|---|
| JP | 11-206043 A | 7/1999 |
| JP | 2001-186663 A | 7/2001 |

(Continued)

OTHER PUBLICATIONS

International Search Report for corresponding International Application No. PCT/JP2011/005630 mailed Dec. 27, 2011.

(Continued)

*Primary Examiner* — Jared Fureman
*Assistant Examiner* — Joel Barnett
(74) *Attorney, Agent, or Firm* — Renner, Otto, Boisselle & Sklar, LLP

(57) ABSTRACT

The power generation system includes first and second power generating units, each of which converts DC energy into RF energy and transmits the power wirelessly, a combining section, which combines the respective outputs of the power generating units together, and an oscillation phase control section, which reduces the phase difference between the RF energies supplied from the two power generating units and. The oscillation phase control section controls a phase difference between the RF energies supplied from the oscillators and belonging to the first and second power generating units and, respectively, so that first and second RF energies supplied from the first and second power generating units and are in phase with each other when combined together by the combining section.

16 Claims, 13 Drawing Sheets

(56) References Cited

U.S. PATENT DOCUMENTS

2009/0243397 A1* 10/2009 Cook et al. .................. 307/104
2010/0033156 A1   2/2010 Abe et al.
2010/0314947 A1* 12/2010 Baarman et al. ............ 307/104

FOREIGN PATENT DOCUMENTS

| | | |
|---|---|---|
| JP | 2004-203178 A | 7/2004 |
| JP | 2005-289101 A | 10/2005 |
| JP | 2006-136045 A | 5/2006 |
| JP | 2006-217731 A | 8/2006 |
| JP | 2006-217731 A | 8/2006 |
| JP | 2008-099436 A | 4/2008 |
| WO | 2007/029438 A1 | 3/2007 |
| WO | 2009/045847 A2 | 4/2009 |

OTHER PUBLICATIONS

Form PCT/ISA/237 and partial English translation for International Application No. PCT/JP2011/005630 dated Dec. 27, 2011.
Search report for corresponding Chinese Application No. 201180004278.0 dated Dec. 2, 2014 with English translation.

* cited by examiner

POWER GENERATION SYSTEM AND POWER GENERATING UNIT

This application claims priority under 35 USC §119(e) to U.S. Provisional Application No. 61/391,286 filed on Oct. 8, 2010, the entire contents of which are incorporated herein by reference.

BACKGROUND OF THE INVENTION

1. Field of the Invention

The present invention relates to a power generation system and power generating unit for transferring energy wirelessly by magnetic resonant coupling.

2. Description of the Related Art

To avoid exhausting valuable natural resources and to cope with the global warming effect that has been growing year by year, people have been paying more and more attention to solar power generation that never releases harmful carbon dioxide. In fact, a power plant for generating a lot of electric power by installing a huge number of solar power generators (i.e., so-called "solar cells", which will be sometimes simply referred to herein as "cells") in a wide area has become a reality. In most cases, solar power generators for general consumers have been installed on the roof of a house. Recently, however, some people have proposed putting those cells on the walls of a building, too.

A solar power generation system ordinarily uses a so-called "solar cell module" in which a huge number of cells are arranged inside a metallic frame and connected together. A glass plate is arranged in front of the solar cell module (which will be simply referred to herein as a "module") so that the respective cells operate without being exposed to the air. And by assembling a number of such solar cell modules together, a solar power generation system can be established.

Use of such a solar power generation system, however, has not been widespread yet because the cost of manufacturing those cells and modules is too high, which is one of the major obstacles to its introduction. On top of that, the cost of establishing such a system by installing those cells and modules is also too high to neglect. Among other things, the higher the altitude of the place of installation, the riskier and the more expensive the installation work will be, which is a serious problem to overcome in order to further popularize the solar power generation system. What is more, to introduce a solar power generation system into an existing building, it is difficult to install the wiring connecting the solar power generating section outside of the building to electronic devices inside of the building, which is also one of the big problems with conventional solar power generation systems.

As will be described later, in a conventional solar power generation system, the output voltage of each of its cells is so low that a great many solar cells should be connected together in series to obtain a voltage that is high enough to operate an electronic device. And a decrease in reliability at such a very large number of connection points is a decisive factor in the decline of the long-term reliability of the overall system. In addition, if those modules and cables deteriorate with a long-term use, their replacements should also be installed at such a height. Consequently, the cost of maintenance is also non-negligible.

As a conventional solar power generator that would overcome such problems, a power supply system for supplying energy wirelessly from outside of a building and through the walls of the building has been proposed (see Japanese Patent Application Laid-Open Publication No. 2006-136045 (Embodiment 5 and FIG. 16), for example). Such a power supply system transmits RF (radio frequency) energy through the walls by electromagnetic induction.

Meanwhile, a power generation system that uses a fuel cell such as a polymer electrolyte fuel cell has also become more and more popular these days. In a power generation system of that type, the output voltage of each of its cells is also so low that a great many solar cells should be connected together in series to obtain a sufficiently high voltage. That is why as in the solar power generating device, a decrease in reliability at such a huge number of connection points is a decisive factor in the decline of the long-term reliability of the overall system.

On the other hand, United States Patent Application Publication No. 2008/0278264 (FIGS. 5 and 10) discloses a new type of wireless energy transfer system for transferring energy wirelessly from one of two resonators to the other, and vice versa. That wireless energy transfer system couples those two resonators with each other via the evanescent tail of the oscillation energy of the resonant frequency that is produced in the space surrounding those two resonators, thereby transferring the oscillation energy wirelessly (i.e., by a non-contact method). Such an energy transfer method in which a magnetic field distribution is used by resonators will be referred to herein as "magnetic resonance method".

According to United States Patent Application Publication No. 2008/0278264, the wireless power transmission by the magnetic resonance method should increase the transmission distance by leaps and bounds compared to the conventional electromagnetic induction method. That is to say, if the coupling coefficient k between the resonators is greater than the root of the product of the respective attenuation constants $\Gamma 1$ and $\Gamma 2$ of the two resonators, energy should be transferred as intended.

The power supply system disclosed in Japanese Patent Application Laid-Open Publication No. 2006-136045, however, cannot overcome the solar power generation device's own problem that the output voltage of each cell is low. In the field of solar power generation, a crystalline silicon based solar cell, which is currently used broadly due to its high energy conversion efficiency, has an output voltage Vc of just about 0.5 V. For example, if the DC output of a solar power generating section needs to be converted into AC power, the operation efficiency of a normal power conditioner is maximized in response to an input voltage of approximately 300 Vdc. That is why to get that conversion done with high efficiency, the output voltage of the solar power generating section should be increased to the vicinity of 300 V by connecting as many as several hundreds of cells in series together. On the other hand, if connected to a single-phase, three-line system (with a working voltage of 100 V or 200 V), which is a normal household wiring system, the solar power generating section may have its output voltage increased by a power conditioner as much as 200 fold or more. Considering the decrease in power efficiency to be caused by increasing the voltage that much, it is still preferred that a huge number of cells be connected in series together to increase the output voltage of the solar power generating section as much as possible.

It should be noted that even if the DC voltage is not converted into AC power within such a solar power generation system, a similar problem will also arise. For example, in a DC power supply system that has attracted a lot of attention these days, its working voltage will be either 48 Vdc or within the range of 300 to 400 Vdc. That is why even when solar energy needs to be supplied to a DC power supply system, several tens to several hundreds of solar cells also need to be connected in series together.

However, the greater the number of cells or modules to be connected in series together, the more easily the overall performance of the system will decline due to either so-called "partial shading" (i.e., some of the installation zone goes into the shade) or deterioration in the property of some of those cells or modules to be installed. To overcome such a problem, normally a countermeasure such as introduction of a bypass diode into each module is taken. Such a measure is not preferred because an excessive quantity of heat will be generated or the cost will rise significantly in that case. Meanwhile, even when the voltage needs to be increased using a normal DC/DC converter with a voltage boosting function, it is also difficult to achieve a voltage step-up ratio that is high enough to significantly reduce the number of cells to be connected in series together.

Likewise, even in a power generation system that uses a fuel cell, the overall performance of the system will decline easily when the property of some of those cells or power generating stacks deteriorate, as in the solar power generating device.

A preferred embodiment of the present invention is designed so as to overcome the aforementioned problems with conventional systems by wireless power transmission using magnetic resonant coupling and it is therefore an object of the present invention to provide a power generation system that can still maintain high output power even if the property of some power generating units deteriorate by combining the RF outputs of multiple power generating units together and of which the efficiency does not decrease even by combining those RF outputs.

SUMMARY OF THE INVENTION

A power generation system according to the present invention includes first and second power generating units, a combining section, and an oscillation phase control section. Each power generating unit includes: a power generating device, which outputs DC energy; an oscillator, which converts the DC energy supplied from the power generating device into RF energy having a frequency f0 and which outputs the RF energy; a power transmitting antenna, which transmits the RF energy supplied from the oscillator; and a power receiving antenna, which receives at least a part of the RF energy that has been transmitted by the power transmitting antenna. The resonant frequencies of the power transmitting and power receiving antennas are set to be equal to the frequency f0. The power generating unit outputs the RF energy that has been received by the power receiving antenna. The combining section receives and combines the RF energies supplied from those power generating units and outputs combined RF energy. The oscillation phase control section controls a phase difference between the RF energies supplied from the oscillators belonging to the first and second power generating units, respectively, so that first and second RF energies supplied from the first and second power generating units are in phase with each other when combined together by the combining section.

Another power generation system according to the present invention includes first and second power generating units, a combining section, and a reactance control circuit. Each said power generating unit includes: a power generating device, which outputs DC energy; an oscillator, which converts the DC energy supplied from the power generating device into RF energy having a frequency f0 and which outputs the RF energy; a power transmitting antenna, which transmits the RF energy supplied from the oscillator; and a power receiving antenna, which receives at least a part of the RF energy that has been transmitted by the power transmitting antenna. The resonant frequencies of the power transmitting and power receiving antennas are set to be equal to the frequency f0. The power generating unit outputs the RF energy that has been received by the power receiving antenna. The combining section receives and combines the RF energies supplied from those power generating units and outputs combined RF energy. The reactance control circuit is inserted to a transmission line between the oscillator and the power transmitting antenna or a transmission line between the power receiving antenna and the combining section in at least one of the first and second power generating units. The reactance control circuit includes an inductor and/or a capacitor and sets a reactance value so that the first and second RF energies that have been supplied from the first and second power generating units are in phase with each other when combined by the combining section.

A power generating unit according to the present invention includes: a power generating device, which outputs DC energy; an oscillator, which converts the DC energy supplied from the power generating device into RF energy having a frequency f0 and which outputs the RF energy; a pulse generator, which generates a pulse that defines the phase of the RF energy supplied from the oscillator, applies the pulse to that oscillator, includes an input section that receives an externally input control signal and generates the pulse in response to the input of the control signal; a power transmitting antenna, which transmits the RF energy supplied from the oscillator; and a power receiving antenna, which receives at least a part of the RF energy that has been transmitted by the power transmitting antenna. The resonant frequencies of the power transmitting and power receiving antennas are set to be equal to the frequency f0. And the power generating unit outputs the RF energy that has been received by the power receiving antenna.

A power generation system according to the present invention can transmit power wirelessly. Thus, according to the present invention, the cost of installing the power generating device can be reduced and the job of replacing a deteriorated part of the power generating device can get done more easily. In addition, when RF energies supplied from multiple power generating units are combined together, the phase difference between those RF energies can be reduced. As a result, a higher output power can be obtained. On top of that, in a preferred embodiment of the present invention, the output voltage of the power generating device of each of multiple power generating units can be increased without connecting those power generating devices in series together. Consequently, a power generation system that can operate with high efficiency and good stability can be established.

Other features, elements, processes, steps, characteristics and advantages of the present invention will become more apparent from the following detailed description of preferred embodiments of the present invention with reference to the attached drawings.

DETAILED DESCRIPTION OF PREFERRED EMBODIMENTS

First of all, before preferred embodiments of the present invention are described, it will be described with reference to FIGS. 1 and 2 how the present invention works in principle.

Figure 1:
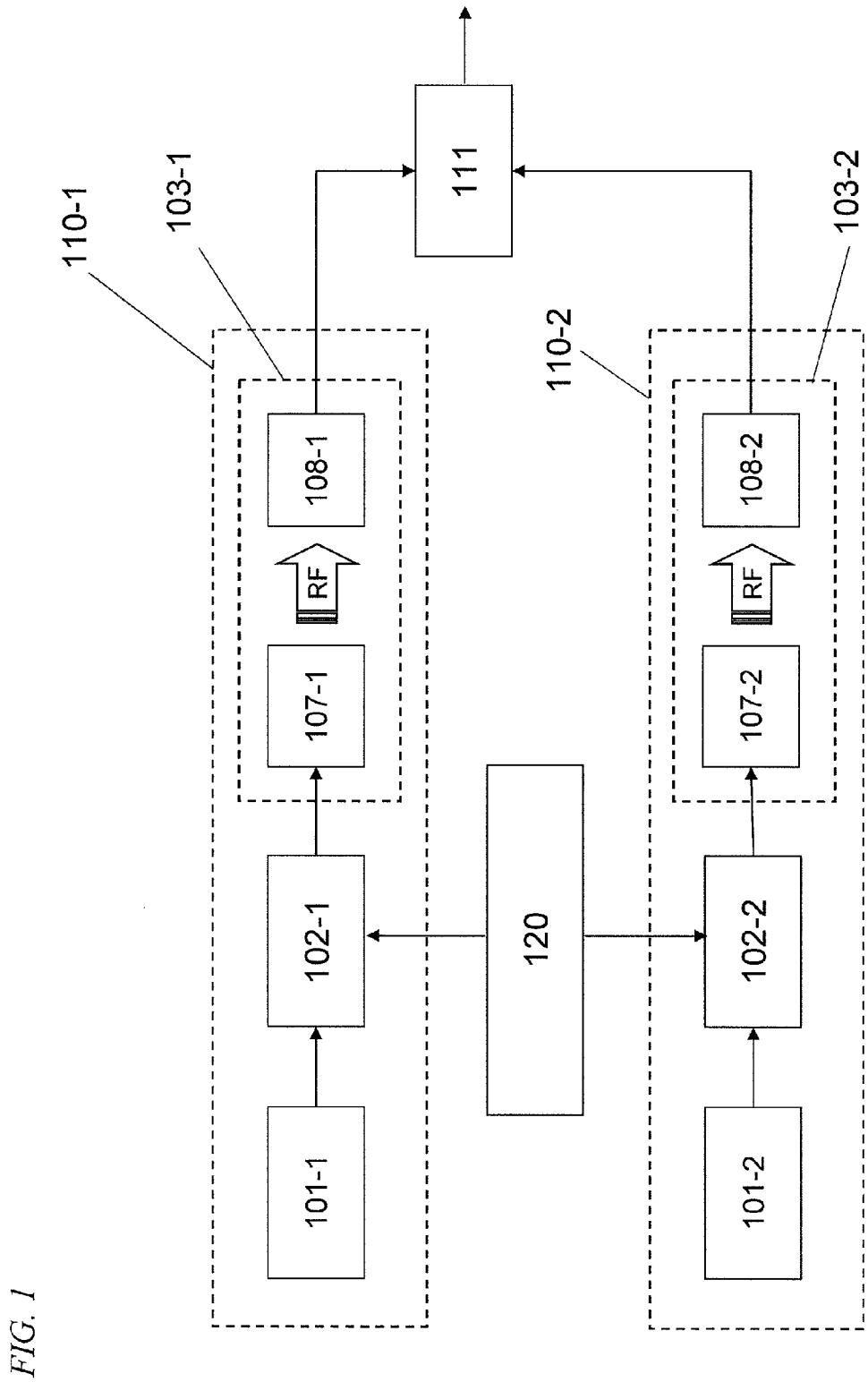
FIG. 1 is a block diagram illustrating an exemplary power generation system according to the present invention.

FIG. 1 is a block diagram illustrating a general arrangement for a power generation system according to the present invention. This power generation system includes first and second power generating units 110-1 and 110-2 and a combining section 111, which combines together the respective outputs of the first and second power generating units 110-1 and 110-2. It should be noted that in this description, each element belonging to the first power generating unit 110-1 will be identified herein by a reference numeral ending with "-1" and each element belonging to the second power generating unit 110-2 will be identified herein by a reference numeral ending with "-2". On the other hand, if any element of the power generation system, which is included in common in both of these two power generating units 110, just needs to be referred to, that element will be identified herein by its own reference numeral without the identifier "-1" or "-2".

Each power generating unit 110 includes a power generating device 101 that outputs DC energy, an oscillator 102 that converts the DC energy supplied from the power generating device 101 into radio frequency (RF) energy having a frequency f0, and a wireless transmission section 103 that transmits wirelessly the RF energy supplied from the oscillator 102. The wireless transmission section 103 includes a power transmitting antenna 107 and a power receiving antenna 108 and transmits power wirelessly by the magnetic resonant coupling method to be described later. Thus, the RF energy supplied from the oscillator 102 is transmitted wirelessly from the power transmitting antenna 107 to the power receiving antenna 108. Then, the power receiving antenna 108 sends the RF energy that has been transmitted from the power transmitting antenna 107 to the combining section 111. On receiving the RF energies (which will be sometimes referred to herein as "RF outputs") from these two power generating units 110, the combining section 111 combines those RF energies together and outputs the combined energy to an external load or utility grid.

The power generation system shown in FIG. 1 further includes an oscillation phase control section 120 that performs a phase control on the two oscillators 102-1 and 102-2 so that the phase difference between the two power generating units 110-1 and 110-2 becomes substantially equal to zero when their RF outputs are combined with each other. The oscillation phase control section 120 controls a phase difference between the RF energies supplied from the two oscillators 102-1 and 102-2 so that when the two RF outputs are combined together, no phase difference is produced between them. Through this phase control performed by the oscillation phase control section 120, a high output can be obtained.

Although only two power generating units are connected in parallel in this example, the power generation system of the present invention may also be designed so as to obtain an even higher output by connecting three or more power generating units in parallel with each other and combining the respective outputs of those power generating units with each other. In that case, the phase control by the oscillation phase control section 120 may be performed on not only the oscillators of the first and second power generating units 110-1 and 110-2 but also those of the other power generating units as well. To maximize the output of the combining section 111, the phase control described above is preferably performed on the oscillator 102 of every power generating unit 110 so that the respective RF outputs of all power generating units are in phase with each other when combined with each other.

By performing such a phase control, even if the transmission line length to the combining section 111 varies from one power generating unit 110 to another, for example, a high output can also be maintained. Likewise, even if the respective power generating devices 101 operate in mutually different power generating environments (each including the temperature and the irradiance), a high output can also be maintained.

In the power generation system described above, the oscillation phase control section 120 is supposed to control the phases of the respective oscillators 102. However, the phase control may also be made in any other method. The power generation system of the present invention just needs to be designed so that when combined with each other, the RF energies supplied from at least two power generating units 110-1 and 110-2 are in phase with each other.

Figure 2:
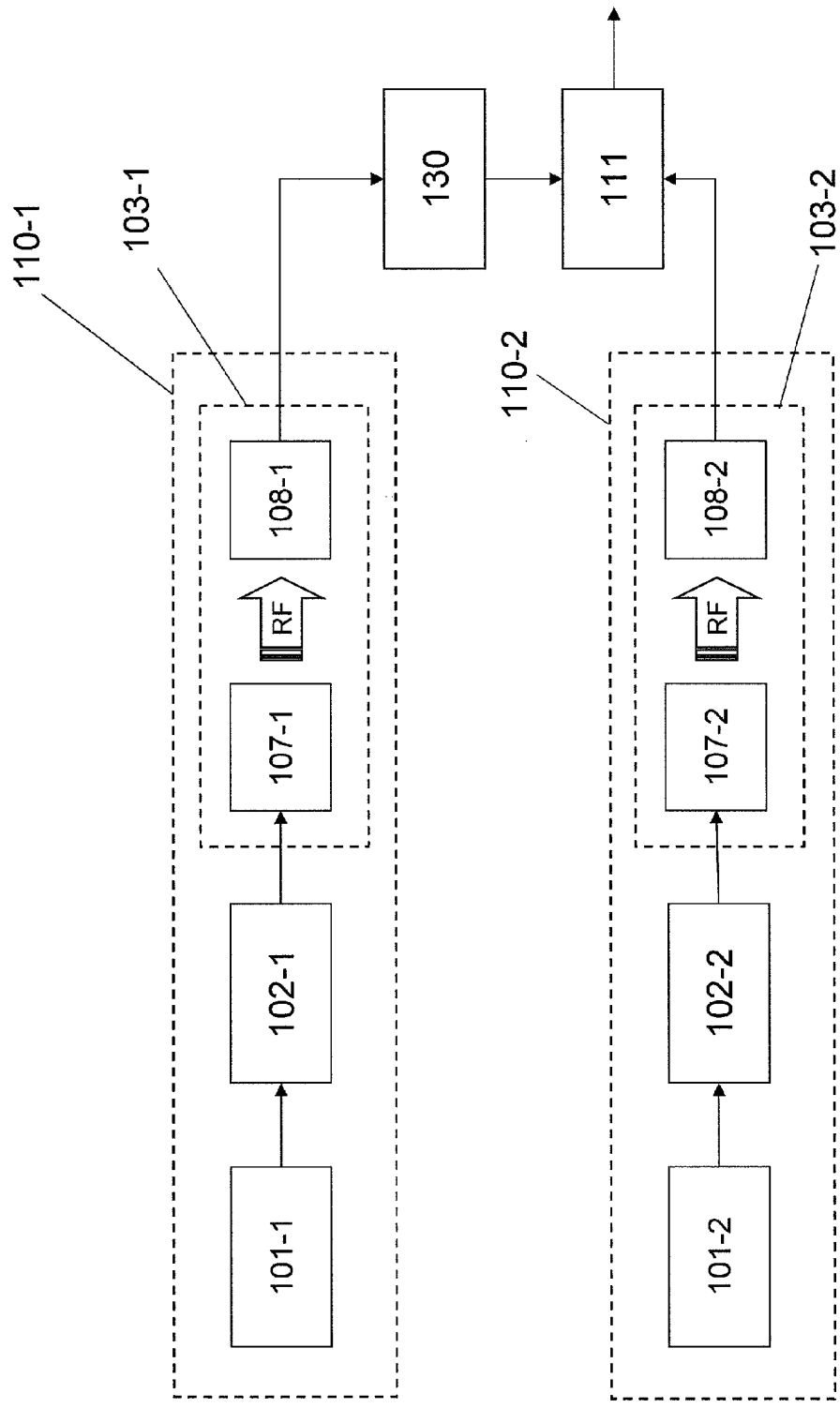
FIG. 2 is a block diagram illustrating another exemplary power generation system according to the present invention.

FIG. 2 is a block diagram illustrating a general configuration for another power generation system according to the present invention. The power generation system shown in FIG. 2 includes a reactance control circuit 130, which includes an inductor and/or a capacitor, instead of the oscillation phase control section 120 described above. In the power generation system shown in FIG. 2, the reactance control circuit 130 is inserted onto the transmission line between the power receiving antenna 108-1 of the first power generating unit 110-1 and the combining section 111. It should be noted that the reactance control circuit 130 does not always have to be arranged at that location but may also be inserted between the oscillator 102-1 and the power transmitting antenna 107-1 as well.

The reactance control circuit 130 is typically an LC circuit and includes an inductor and/or a capacitor. The reactance value of the reactance control circuit 130 is set so that the RF outputs of the first and second power generating units 110-1 and 110-2 are in phase with each other when combined by the combining section 111. By inserting such a reactance control circuit 130 onto the transmission line, the phase shift between the RF outputs being combined with each other can be reduced and a high output can be obtained.

In the example illustrated in FIG. 2, the phase control effect is achieved by the reactance control circuit 130 with respect to only the first power generating unit 110-1. However, the phase may also be controlled by the reactance control circuit 130 with respect to the second power generating unit 110-2. Furthermore, if three or more power generating units are connected in parallel with each other, then the reactance control circuit 130 is preferably arranged with respect to every power generating unit so that the RF outputs of all of those power generating units are in phase with each other while being combined with each other.

As described above, the power generation system of the present invention can reduce such a phase shift that could be caused when RF energies supplied from multiple power generating units are combined with each other, and therefore, can generate power with high efficiency. Hereinafter, it will be described how advantageous the present invention can be over the prior art.

Generally speaking, in a solar power generation system, the length of the transmission line from a solar cell module to the point of combination varies from one solar cell module to another, and therefore, the RF outputs being combined with each other are often out of phase with each other. That is why even if those outputs are combined with each other, a high output may not be obtained in some cases. A solar power generation system for general households is formed by combining roughly 10 to 20 solar cell modules of about 10 m square. For that reason, if the respective outputs of those modules are combined together at a single point, the transmission line length will vary from one module to another and their biggest difference could be approximately 10 m. The higher the frequency, the greater the phase difference between the RF outputs due to such a variation in transmission line length between the modules. And if such RF outputs in significantly different phases were combined with each other, then the overall power would decrease, and therefore, the transfer efficiency would decline as a whole, too.

Also, in each power generating unit 110, when the output terminal of the power receiving antenna 108 is connected to a load, the output impedance of the power generating device 101 is preferably matched to the input impedance of the oscillator 102. In this case, the output impedance of the power generating device 101 is preferably impedance that maximizes the output power. Likewise, the output impedance Zout of the RF energy supplied from the oscillator 102 is preferably substantially equal to the input impedance Zin of the power transmitting antenna 107. Furthermore, when the oscillator 102 is connected to the power transmitting antenna 107, the output impedance Zout of the power receiving antenna 108 is preferably substantially equal to the resistance value R of the load connected to the power receiving antenna 108. These are conditions to be preferably satisfied in order to reduce multiple reflection of the RF energy between the circuit blocks and to improve the overall power generation efficiency. Nevertheless, even when the input and output impedances of the respective circuit blocks are converted to satisfy these conditions, a phase shift will occur in most cases.

In order to overcome these problems, the present invention provides a power generation system and power generating unit that does not cause a significant decrease in efficiency even when the respective RF outputs of the power generating units 110 are combined together. In addition, since power is transmitted wirelessly, the installation work and the job of replacing some cells or modules can get done much more easily.

The present invention is applicable to not just a solar power generation system but also a fuel cell power generation system that uses a polymer electrolyte fuel cell, for example. According to the present invention, the ordinarily low output voltage of a power generating stack can be raised significantly on a cell-by-cell basis. Added to that, stabilized energy output can be maintained even if the pressure of hydrogen gas supplied or the environmental temperature varies. On top of that, even if any of those cells has gone out of order, such a defective cell can also be replaced very easily in such a power generation system using a fuel cell.

Hereinafter, preferred embodiments of the present invention will be described with reference to FIGS. 3 through 12. In the following description, any pair of components shown in multiple drawings and having substantially the same function will be identified by the same reference numeral.

Embodiment 1

Figure 3:
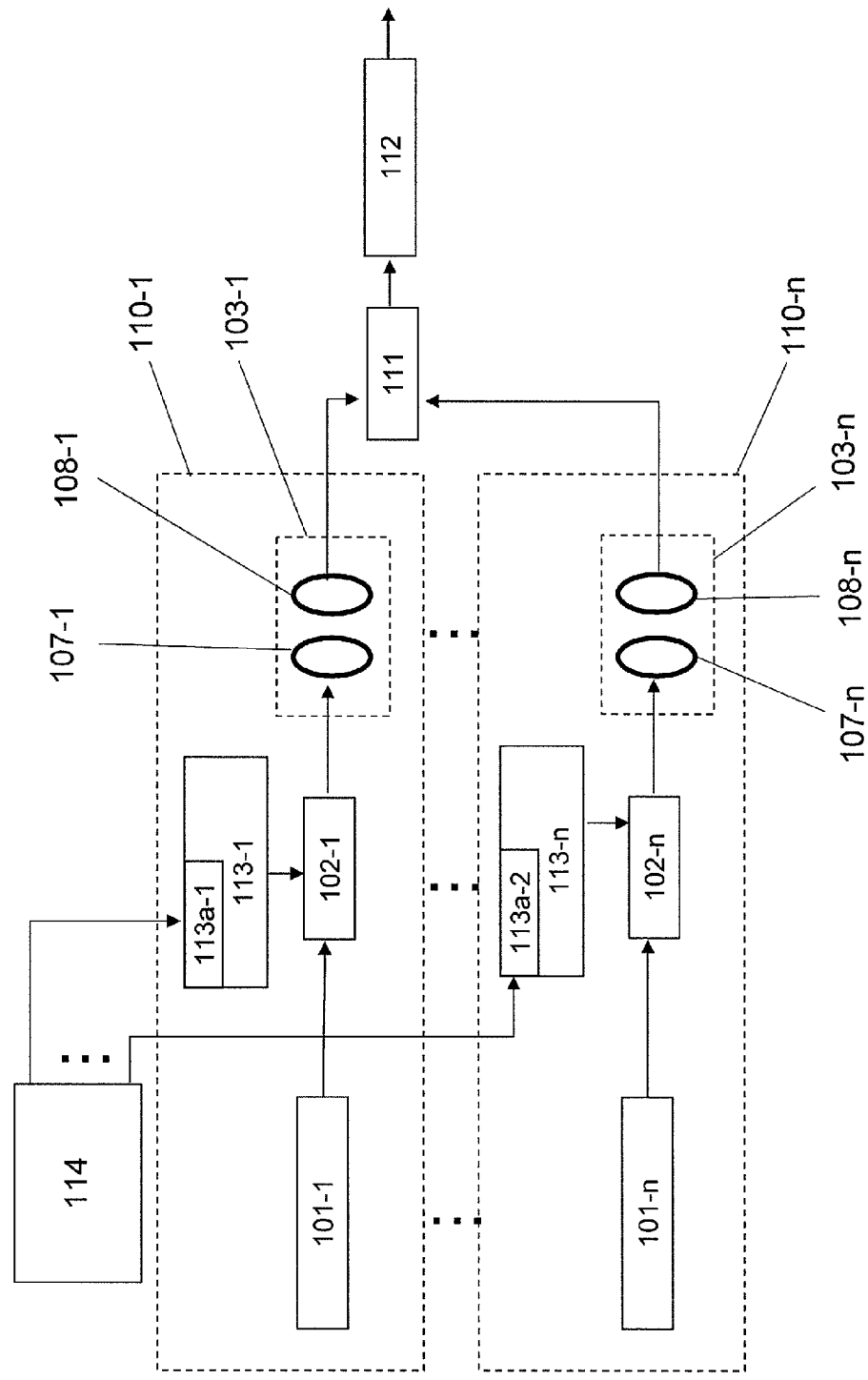
FIG. 3 illustrates an overall arrangement for a power generation system as a first preferred embodiment of the present invention.

First of all, a First Specific Preferred Embodiment of the present invention will be described with reference to FIGS. 3 through 8. FIG. 3 illustrates an overall arrangement for a power generation system as a first preferred embodiment of the present invention. The power generation system of this preferred embodiment includes: a number of power generating units 110-1, . . . and 110-n, each of which converts the solar energy into RF energy and transmits the RF energy; a combining section 111 that combines together the respective RF energies supplied from those power generating units and outputs the combined RF energy; and a power converting section 112 that converts the combined RF energy obtained by the combining section 111 into either DC energy or AC energy with a lower frequency than the RF energy and then outputs the converted DC or AC energy to a load (such as an electronic device) or a utility grid.

Each power generating unit 110 includes: a power generating device 101 that converts the solar energy into DC energy; an oscillator 102 that converts the DC energy supplied from the power generating device 101 into RF energy having a frequency f0 and outputs the RF energy; and a wireless transmission section 103 that transmits wirelessly the RF energy supplied from the oscillator 102. The wireless transmission section 103 includes a power transmitting antenna 107, which is a series resonant circuit, and a power receiving antenna 108, which is a parallel resonant circuit, and transmits power by the magnetic resonant coupling method to be described later. In each power generating unit 110, the power receiving antenna 108 receives the RF energy that has been transmitted wirelessly from the power transmitting antenna 107 and then outputs the RF energy to the combining section 111.

In this preferred embodiment, any number of power generating units may be provided as long as the number is at least two. And in the following description of this preferred embodiment, the number of power generating units provided will be identified by n (where n is an integer that is equal to or greater than two). The number n of power generating units provided can be determined arbitrarily according to the area of the location where the power generating devices 101 are installed and/or the power required. In FIG. 3, each element belonging to the $n^{th}$ power generating unit 110n is identified by a reference numeral ending with "-n". In the following description of this preferred embodiment, if any element of the power generation system, which is included in common in each of those power generating units, just needs to be referred to, that element will be identified herein by its own reference numeral without the identifier "-1", . . . or "-n".

The power generation system of this preferred embodiment further includes n pulse generators 113-1, . . . and 113-n, each of which is provided for an associated one of the n power generating units 110-1, . . . and 110-n one to one, and a pulse control section 114 that instructs each of those pulse generators exactly when to generate a pulse. And each pulse generator 113 is arranged close to the oscillator 102 in its associated power generating unit 110. The pulse control section 114 and the n pulse generators 113-1, . . . and 113-n of this preferred embodiment together functions as the oscillation phase control section 120 of the present invention. Each pulse generator 113 generates a pulse that defines the phase of RF energy to be output by the oscillator 102 of its associated power generating unit 110 and applies that pulse to the oscillator 102. Also, each pulse generator 113 has an input section 113a, which receives a control signal from the pulse control section 114, and generates a pulse in response to the control signal received. The pulse control section 114 determines when the respective pulses should be generated so as to reduce the phase shift that could be caused between the RF outputs being combined together, and sends a control signal to the input section 113a of each pulse generator 113 either through a cable or wirelessly, thereby instructing the pulse generator 113 to generate a pulse. It will be described in detail later exactly how the phase control is done by the pulse control section 114 and the pulse generators 113.

In this preferred embodiment, the transmission distance from each pulse generator 113 to its associated oscillator 102 and the transmission distance from each oscillator 102 to its associated power transmitting antenna 107 are supposed to be the same in all of those power generating units 110-1, . . . and 110-n. However, even if those transmission distances are not the same in all of those power generating units, the effects of this preferred embodiment can also be achieved by performing the phase control to be described later with the difference in transmission distance taken into account. Also, although the pulse generator 113 and the oscillator 102 are provided as two separate circuits in this preferred embodiment, the pulse generator 113 may form an integral part of the oscillator 102 as well.

Hereinafter, the respective elements of this power generation system will be described in detail one by one.

In this preferred embodiment, the power generating device 101 includes a number of solar cells (which will be sometimes simply referred to herein as "cells") that are connected in series together or in parallel with each other. To increase the power generation efficiency as much as possible, the solar cells are preferably crystalline silicon solar power generators. But the solar cells for use in the present invention may also be any of various other types of solar power generators that use a compound semiconductor material such as gallium arsenide or a CIS based material. Or the solar cells may even be any of numerous kinds of solar power generators that use an organic material. If a semiconductor material is used, the crystal structure of the semiconductor may be a single crystalline, polycrystalline or amorphous one. Optionally, a tandem type solar power generator, in which several types of semiconductor materials are stacked one upon the other, may also be used.

Figure 4A:
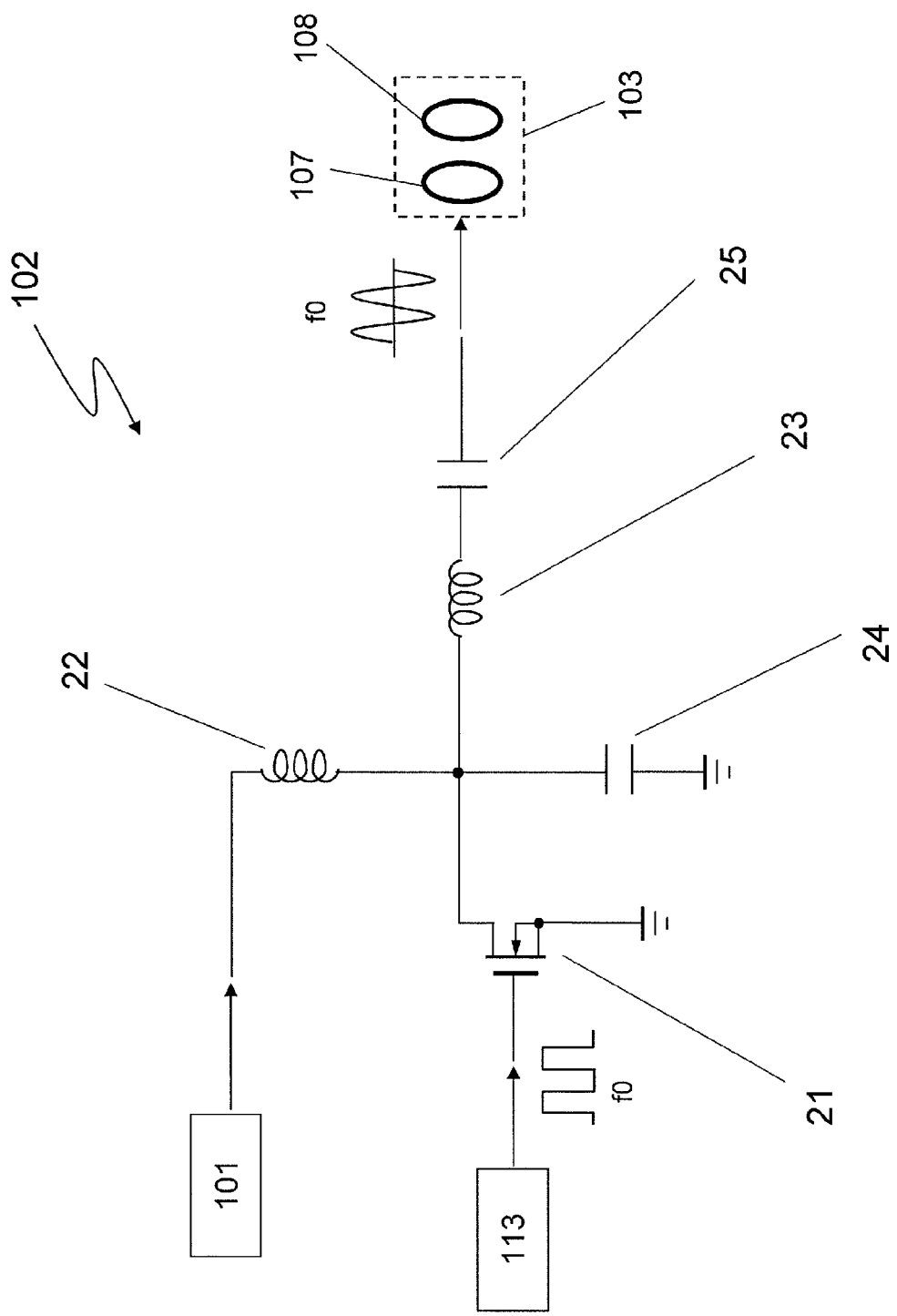
FIG. 4A illustrates a specific configuration for an oscillator according to the first preferred embodiment of the present invention.

As the oscillator 102, a class D, E or F amplifier that would realize high efficiency and low distortion may be used. FIG. 4A illustrates an example of a specific configuration for the oscillator 102 of this preferred embodiment. This is a configuration that is normally called a "class E oscillator". The oscillator 102 includes a switching element 21 such as a MOSFET, inductors 22, 23 and capacitors 24, 25. A pulse with a frequency f0 is generated by the pulse generator 113 and applied as a gate drive pulse to the switching element 21. The respective inductances of the inductors 22, 23 and the respective capacitances of the capacitors 24, 25 are controlled so that the RF energy output by this oscillator 102 has the frequency f0. In this case, the phase of the RF energy output by this oscillator 102 is determined by exactly when the switching element 21 is switched in response to the pulse applied by the pulse generator 113. The output RF energy of the oscillator 102 is then supplied to the wireless transmission section 103. The frequency f0 may be set within the range of 50 Hz to 300 GHz, and preferably falls within the range of 100 kHz to 10 GHz and more preferably within the range of 100 kHz to 20 MHz.

The wireless transmission section 103 includes a power transmitting antenna 107 and a power receiving antenna 108. The power-transmitting antenna 107 is a series resonant circuit including an inductor and a capacitor, while power-receiving antenna 108 is a parallel resonant circuit also including an inductor and a capacitor. The respective resonant frequencies fT and fR of the power-transmitting and power-receiving antennas are set to be equal to the frequency f0 of the RF energy generated by the oscillator 102. By setting the resonant frequencies fT and fR to be equal to the frequency f0, the output impedance Zout of the power-receiving antenna is defined to be higher than the input DC impedance Zidc of the oscillator 102.

The respective inductors are preferably made of copper, silver or any other conductor with good electrical conductivity. As RF current with RF energy flows mostly around the surface of a conductor, the surface of the conductor may be covered with a material with high electrical conductivity to increase the power generation efficiency. If the inductors are designed so as to have a cavity in the middle of its cross section, their weight can be reduced. Furthermore, if the inductors are formed by adopting a parallel wiring structure with Litz wires, for example, then the conductor loss per unit length can be reduced and the Q factors of the series resonant circuit and the parallel resonant circuit can be increased. As a result, power can be transmitted with even higher efficiency.

To cut down the manufacturing cost, the wiring may be formed at a time by ink printing technique. If necessary, a magnetic body may be arranged near each inductor. However, the coupling coefficient between the respective inductors of the power transmitting and power receiving antennas 107 and 108 should not be set to be an excessively high value. For that reason, it is preferred that inductors with an air-core spiral structure, which can set the coupling coefficient between the inductors to a moderate value, be used.

Each inductor has typically a coiled shape. However, each inductor does not always have to have such a shape. Since in high-frequency oscillation, a conductor with a certain length of wire has an inductance, it behaves as an inductor. For another example, bead-shaped ferrite in which a conducting wore is arranged also behaves as an inductor.

To achieve as high transfer efficiency as possible, the respective inductors of the power transmitting and power receiving antennas 107 and 108 are preferably arranged so as to face each other. Nevertheless, the inductors do not always have to face each other but could be arranged in any other way unless they cross each other at right angles.

As the capacitors, any type of capacitors, which may have a chip shape, a lead shape or any other appropriate shape, may be used. Optionally, the capacitance produced between two levels of wires that interpose the air between them could also function as the capacitors. If the capacitors are implemented as MIM capacitors, a low-loss capacitor circuit can be formed by known semiconductor device processing or multilevel circuit board process.

Figure 4B:
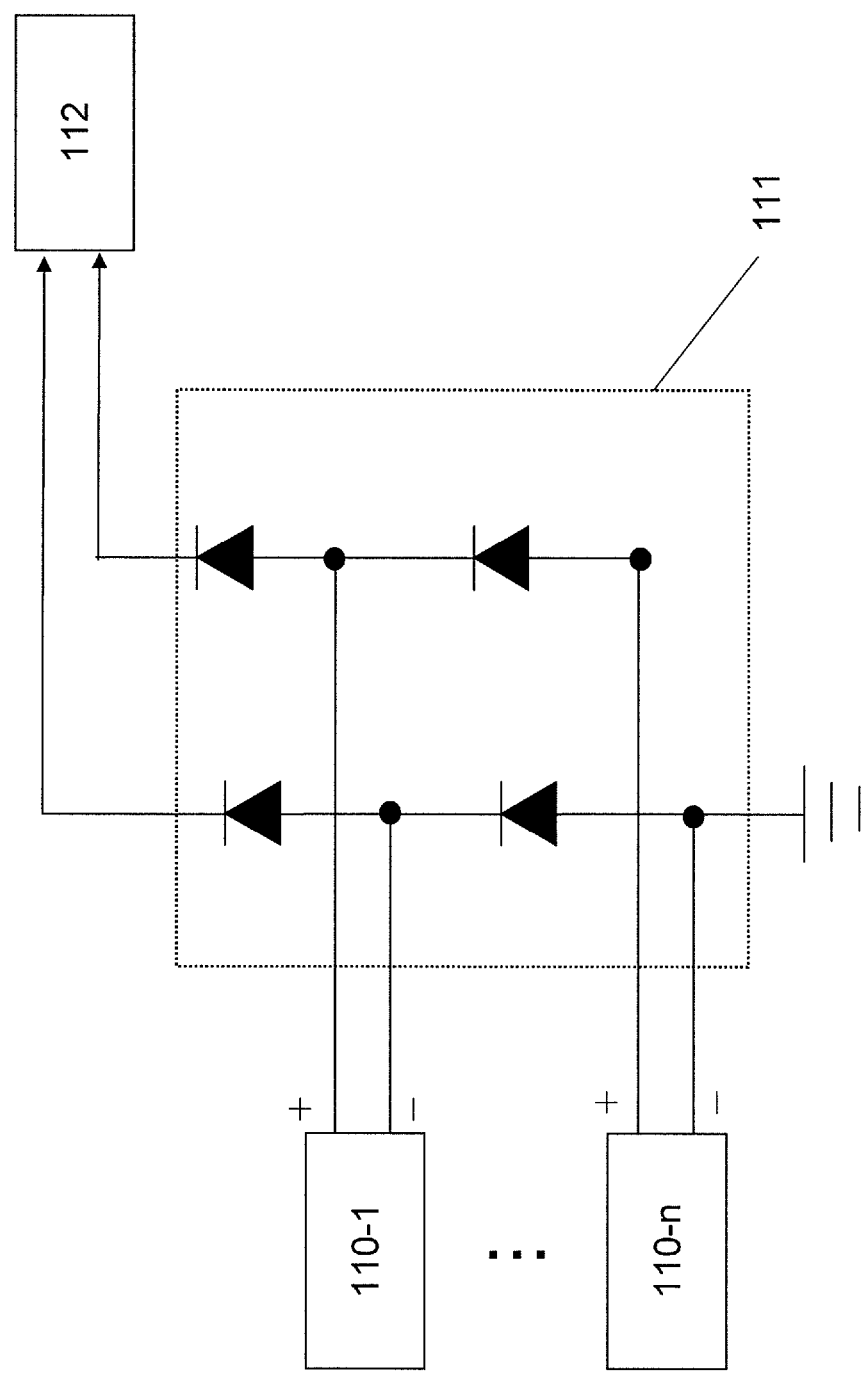
FIG. 4B illustrates a specific configuration for a combining section according to the first preferred embodiment of the present invention.

The combining section 111 has a configuration in which the respective positive output terminals of the power generating units 110 are connected together and the respective negative output terminals of the power generating units 110 are also connected together as shown in FIG. 4B, thereby combining the respective RF energies supplied from those power generating units. The combining section 111 preferably includes multiple diodes to prevent reverse current from flowing between connection points. The combined RF energy is output to the power converting section 112. The combining section 111 does not have to have the configuration shown in FIG. 4B but may also have any other configuration as long as the combining section 111 can combine together the respective RF energies supplied from the multiple power generating units.

The power converting section 112 converts the RF energy, which has been combined by the combining section 111, into either DC energy or AC energy for commercial use. In converting the RF energy into DC energy, a known rectifier may be used as the power converting section 112. As the rectifier, a full-wave rectifier or a bridge rectifier may be used. For example, a half-wave voltage doubler rectifier circuit or a full-wave voltage doubler rectifier circuit may be used. Or a high voltage step-up ratio rectifier that can achieve a voltage step-up ratio of three or more may also be used.

In converting the RF energy into AC energy for commercial use, a known frequency converter may be used. The frequency converter may be any of various types of circuits, examples of which include a circuit that performs a direct frequency conversion such as a matrix converter and a circuit that performs an indirect frequency conversion. The same can be said about the output configuration. That is to say, any of various frequency converter circuit technologies, which process single- and three-phase outputs, for example, is applicable to the present invention.

Hereinafter, it will be described how wireless power transmission is carried out by magnetic resonant coupling according to this preferred embodiment.

In this preferred embodiment, the "antenna" is not an ordinary antenna for transmitting or receiving an electromagnetic wave but an element for transferring energy from one of two objects to the other, and vice versa, by using a coupling phenomenon that has been produced by the evanescent tail of the electromagnetic field of the resonator. According to such a wireless power transmission technique that uses the resonant electromagnetic field, energy loss, which would otherwise be caused when an electromagnetic wave is transferred to a distant location, will not be caused, and therefore, the power can be transmitted with very high efficiency. Such an energy transmission technique that uses the coupling phenomenon of a resonant electromagnetic field (i.e., a near field) will cause much less loss than a known non-contact power transmission that uses the Faraday's law of electromagnetic induction. Rather, energy can be transmitted efficiently between two resonators (or antennas), which have an interval of as much as several meters between them.

To carry out a wireless power transmission based on such a principle, coupling by magnetic resonance needs to be produced between two resonant antennas. As described above, according to this preferred embodiment, the resonant frequencies $f_T$ and $f_R$ are both set equal to the frequency $f_0$ of the oscillator 102. However, $f_T$ and/or $f_R$ do not have to be exactly equal to, but may be substantially equal to, $f_0$. That is to say, neither $f_T$ nor $f_R$ needs to completely agree with $f_0$. To transfer energy with high efficiency by taking advantage of the coupling phenomenon between the two resonators, ideally $f_T=f_R$ should be satisfied. But actually there will be no problem as long as there is only a little difference between $f_T$ and $f_R$. As used herein, if the frequency $f_T$ is equal to the frequency $f_R$, then the following inequality (1) should be satisfied:

$$|f_T - f_R| \leq f_T/Q_T + f_R/Q_R \qquad (1)$$

where $Q_T$ is the Q factor of the power-transmitting antenna 107 as a resonator and $Q_R$ is the Q factor of the power-receiving antenna 108 as a resonator. In general, if the resonant frequency is identified by X and the Q factor of a resonator is identified by $Q_x$, a frequency range in which that resonator produces resonance is obtained by $X/Q_x$. If this inequality (1) is satisfied, energy can be transferred between the two resonators by magnetic resonant coupling.

Figure 5:
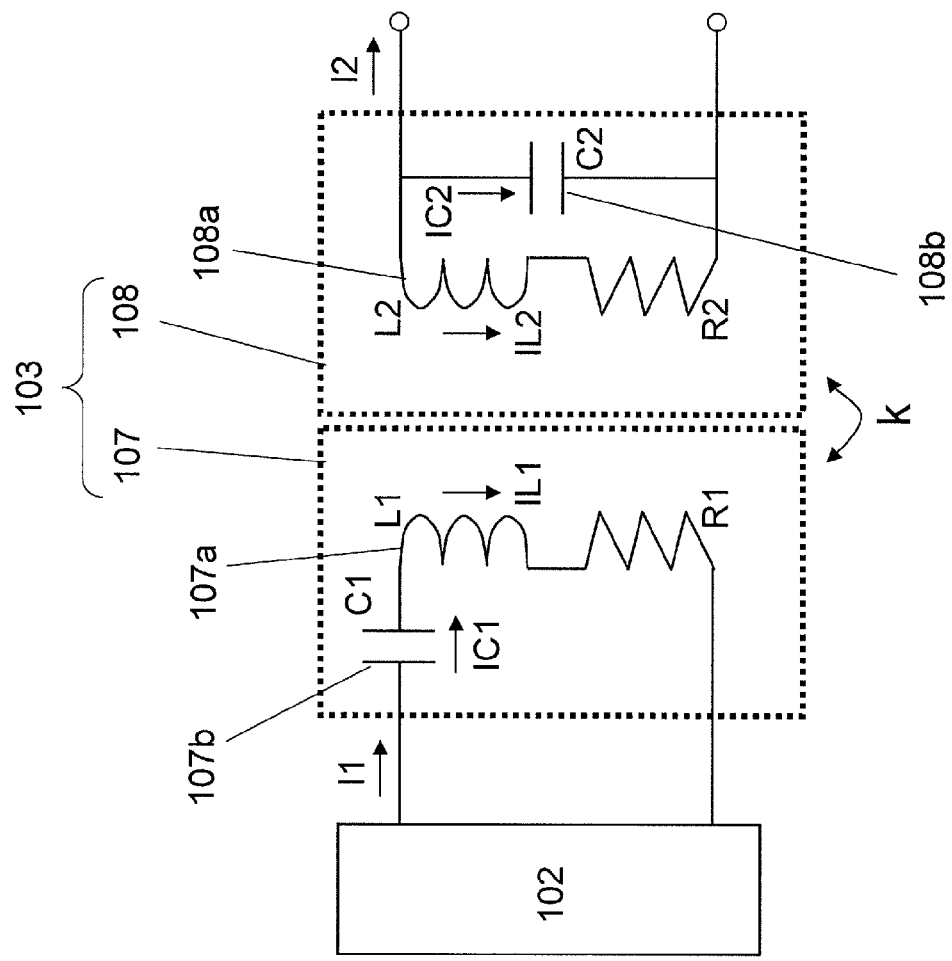
FIG. 5 illustrates an equivalent circuit for a wireless transmission section according to the first preferred embodiment of the present invention.

Next, look at FIG. 5, which illustrates an equivalent circuit for the power-transmitting antenna 107 and the power-receiving antenna 108. In this preferred embodiment, the power-transmitting antenna 107 is a series resonant circuit in which a first inductor 107a and a first capacitor 107b are connected in series together, while the power-receiving antenna 108 is a parallel resonant circuit in which a second inductor 108a and a second capacitor 108b are connected in parallel with each other. The power-transmitting antenna 107 has a parasitic resistance component R1 and the parallel resonant circuit of the power-receiving antenna 108 has a parasitic resistance component R2. It should be noted that unless the voltage increase effect to be described later is used, the power transmitting antenna 107 does not have to be a series resonant circuit but may be a parallel resonant circuit and the power receiving antenna 108 does not have to be a parallel resonant circuit but may be a series resonant circuit.

With the arrangement described above, even if the power needs to go a long distance between the power transmitting and power receiving antennas 107 and 108, the power can still be transmitted with high efficiency. The power generation system of this preferred embodiment can not only transmit power wirelessly between the power transmitting and power receiving antennas 107 and 108 even without connecting them with cables but also increase a low voltage of the energy (power) efficiently as well while the power is being transmitted as will be described later. As a result, the low-voltage energy generated by the power generating device (i.e., solar power generating device) 101 can turn into high-voltage RF energy when received at the power receiving antenna 108.

There may be an obstacle such as a wall or a roof between the power transmitting and power receiving antennas 107 and 108. It should be noted that the power transmitting and power receiving antennas 107 and 108 could be both installed indoors or both arranged outdoors. In either case, the voltage can also be increased while power is being transmitted wirelessly between the two antennas. If both of the power transmitting and power receiving antennas 107 and 108 are installed indoors, then the outdoor power generating device 101 may be connected to the power transmitting antenna 107 by way of a cable to be passed through a hole that has been cut through the wall of the building. On the other hand, if both of the power transmitting and power receiving antennas 107 and 108 are arranged outdoors, the indoor electronic devices may also be connected to the power receiving antenna 108 by way of a cable to be passed through a hole that has been cut through the wall of the building. To eliminate such cable connection between inside and outside of the building, it is preferred that the power transmitting antenna 107 be arranged outdoors and the power receiving antenna 108 be installed indoors.

According to this preferred embodiment, the efficiency of the wireless power transmission depends on the gap between the power transmitting and power receiving antennas 107 and 108 (which will be referred to herein as an "antenna-to-antenna gap") and on the magnitude of loss caused by circuit components that form the power transmitting and power receiving antennas 107 and 108. As used herein, the "antenna-to-antenna gap" substantially means the gap between the two inductors 107a and 108a. The antenna-to-antenna gap can be estimated based on the feature size of the areas occupied by those antennas.

In this preferred embodiment, the inductors 107a and 108a both have the same planar pattern and are arranged so as to face each other and be parallel to each other. As used herein, the "feature size" of the areas occupied by the antennas refers to an inductor size of the smallest one of the antennas. Specifically, if the inductor of an antenna has a circular planar pattern, then the feature size is defined to be the diameter of the inductor. On the other hand, if the inductor has a square planar pattern, the feature size is defined to be the length of each side thereof. And if the inductor has a rectangular planar pattern, the feature size is defined to be the length of its shorter sides. According to this preferred embodiment, even if the antenna-to-antenna gap is approximately 1.5 times as large as the feature size of the antenna's arrangement area, energy can also be transferred with a wireless transfer efficiency of 90% or more.

Next, the voltage increase effect produced by the wireless transmission section 103 of this preferred embodiment will be described with reference to FIG. 5. Suppose the resonator 107 at the transmitting end and the resonator 108 at the receiving end are coupled with each other at a coupling coefficient k. By measuring the two resonant frequencies fL and fH to be isolated when two resonators that produce resonance at the same frequency f0 are arranged close to each other, the coupling coefficient can be derived by the following Equation (2):

$$k=(fH^2-fL^2)/(fH^2+fL^2) \quad (2)$$

Also, the mutual inductance M produced between the first inductor 107a with the inductance L1 and the second inductor 108a with the inductance L2 and the coupling coefficient k satisfy the following Equation (3):

$$M=k\times(L1\times L2)^{0.5} \quad (3)$$

As is apparent from Equation (3), the coupling coefficient k is identical to the well-known coupling coefficient, which has been used as a parameter representing the strength of coupling between inductors or resonators. The value of the coupling coefficient k satisfies 0<k<1. In the conventional energy transfer by electromagnetic induction, the configuration and arrangement of the pair of resonators are designed to achieve as high a coupling coefficient k as possible (which should be close to one, if possible). In contrast, according to the present invention, the coupling coefficient k does not have to be close to one but may be set to be equal to or less than 0.5 as will be described later.

Supposing in the parallel resonant circuit of the power receiving antenna 108, the RF current flowing through the second inductor 108a is identified by IL2 and the RF current flowing through the second capacitor 108b is identified by IC2, the output RF current I2 flowing in the direction shown in FIG. 5 is represented by the following Equation (4):

$$I2=-IL2-IC2 \quad (4)$$

Also, supposing the RF current flowing through the first inductor 107a is identified by IL1, the following Equation (5) can be derived using the RF current IL2 flowing through the second inductor 108a, the RF current IC2 flowing through the second capacitor 108b, the inductance L2 of the second inductor 108a, the parasitic resistance R2 of the second inductor 108a, the inductance L1 of the first inductor 107a and the capacitance C2 of the second capacitor 108b:

$$(R2+j\omega L2)\times IL2+j\omega M\times IL1=IC2/(j\omega C2) \quad (5)$$

Since the resonance condition is satisfied by the power receiving antenna 108, the following Equation (6) is met:

$$\omega L2=1/(\omega C2) \quad (6)$$

The following Equation (7) can be derived from Equations (4), (5) and (6):

$$R2\times IL2+j\omega M\times IL1=j\omega L2\times I2 \quad (7)$$

By modifying this Equation (7), the following Equation (8) is obtained:

$$I2=k\times(L1/L2)^{0.5}\times IL1-j(R2/\omega L2)\times IL2 \quad (8)$$

On the other hand, an index Q factor for evaluating the degree of low loss of the resonator of the power transmitting antenna 107 is given by the following Equation (9):

$$Q2=\omega L2/R2 \quad (9)$$

In this case, if the Q factor of the resonator is very high, approximation that neglects the second term of the right side of Equation (8) is permitted. Thus, the magnitude of the RF current (output current) I2 produced by the power receiving antenna 108 is eventually derived by the following Equation (10):

$$I2=k\times(L1/L2)^{0.5}\times IL1 \quad (10)$$

In this case, the RF current I2 depends on the RF current I1 supplied to the resonator at the transmitting end (i.e., the power transmitting antenna 107), which will be the RF current IL1 to flow through the first inductor 107a, the coupling coefficient k between the resonators (antennas), and the first and second inductances L1 and L2.

As can be seen from Equation (10), the current step-up ratio Ir of each power generating unit 110 of this preferred embodiment is represented by the following Equation (11):

$$Ir=|I2/I1|/Voc==k/Voc\times(L1/L2)^{0.5} \quad (11)$$

Also, the voltage step-up ratio Vr and the impedance conversion ratio Zr are given by the following Equations (12) and (13), respectively:

$$Vr=(Voc/k)\times(L2/L1)^{0.5} \quad (12)$$

$$Zr=(Voc/k)^2\times(L2/L1) \quad (13)$$

As can be seen from Equation (12), if (L2/L1)>(k/Voc)² is satisfied, the voltage step-up ratio Vr is greater than one. Thus, it can be seen that if the coupling coefficient k falls, the voltage step-up ratio Vr rises. According to the conventional energy transfer method by electromagnetic induction, a decrease in coupling coefficient k will lead to a steep decrease in transfer efficiency. According to the magnetic resonant coupling method of the present invention, however, any decrease in coupling coefficient k will never cause such a steep decrease in transfer efficiency. Particularly if the respective Q factors of the resonators that are used as the power transmitting and power receiving antennas 107 and 108 are set to be high values, the decrease in transfer efficiency can be minimized with the voltage step-up ratio Vr increased.

To avoid the influence of partial shading on a solar power generation system, a parallel connection of multiple solar power generating devices is preferred to a series connection of a lot of solar power generating devices. To make a parallel connection of two solar power generating devices realize the same voltage characteristic as what is normally achieved by a series connection of two solar power generating devices, the output voltages of the respective solar power generating devices need to be doubled.

As can be seen from Equation (12), the voltage step-up ratio Vr gets equal to two when $(L2/L1)=4\times(k/Voc)^2$ is satisfied. Thus, according to this preferred embodiment, that relation $(L2/L1) \geq 4\times(k/Voc)^2$ is preferably satisfied. If $(L2/L1) \geq 100\times(k/Voc)^2$ is satisfied, a voltage step-up ratio Vr of 10 or more is achieved. And if $(L2/L1) \geq 10000\times(k/Voc)^2$ is satisfied, a voltage step-up ratio Vr of 100 or more is achieved.

The wireless transmission section 103 of this preferred embodiment can achieve such a high voltage step-up ratio Vr. In this manner, the RF energy that has had its voltage increased on a power generating unit (110) basis is supplied to the combining section 111.

Hereinafter, it will be described how to get phase control done according to this preferred embodiment.

In the power generation system of this preferred embodiment, the length of the transmission line from the power receiving antenna 108 to the combining section 111 varies from one power generating unit 110 to another. That is why phase control needs to be done in order to reduce the phase shift that could be caused when the RF energies supplied from the respective power generating units 110 are combined together. Specifically, information about the length of the transmission line from the power receiving antenna 108 of each power generating unit 110 to the combining section 111 (which will be referred to herein as a "transmission line length information") is defined in advance by either the user or the designer and stored in the pulse control section 114. In accordance with the transmission line length information that has been defined, the pulse control section 114 sends a control signal indicating the timing of switching to each pulse generator 113 (as a trigger to generate a pulse).

Figure 6:
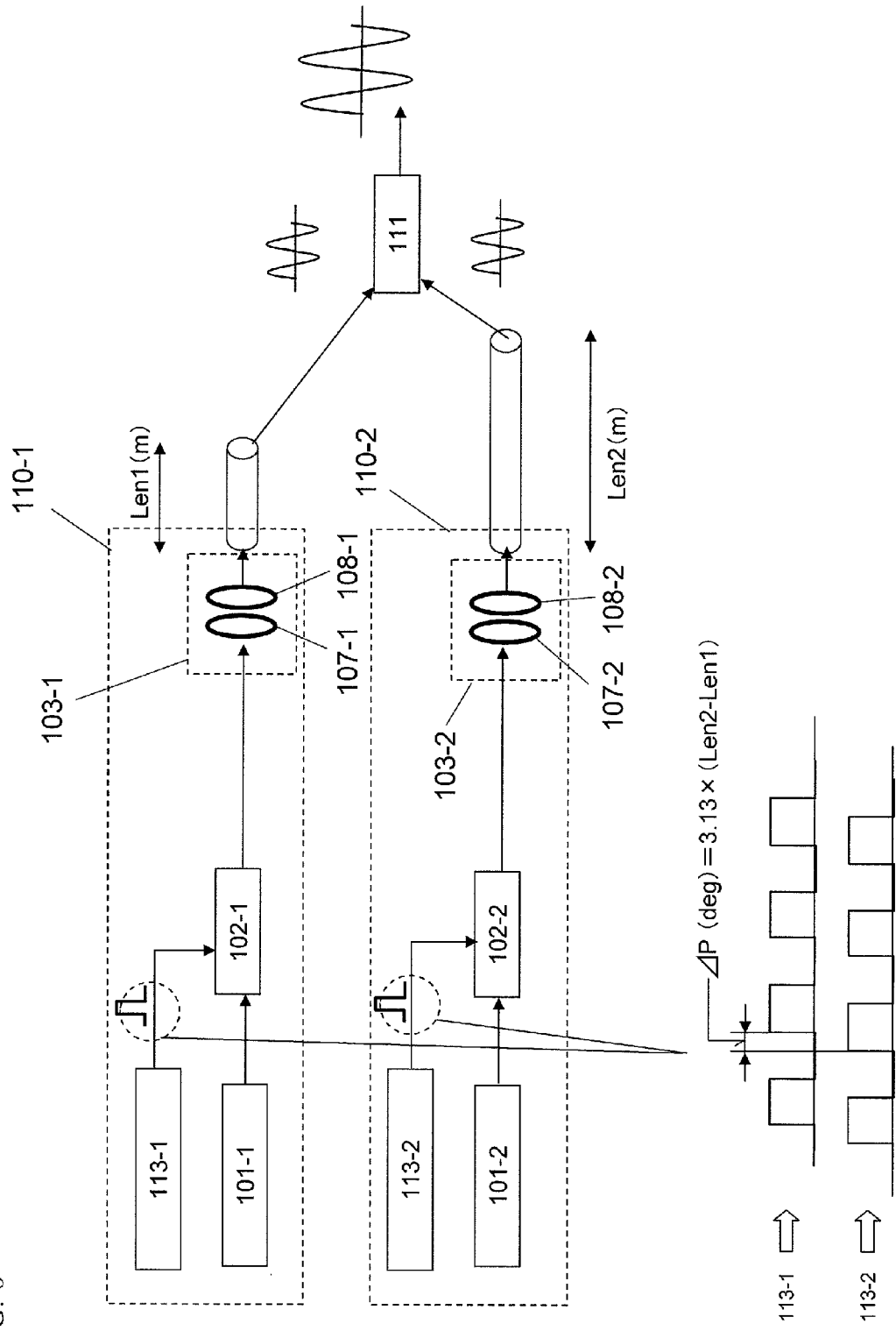
FIG. 6 illustrates how a phase control is carried out by a pulse control section according to the first preferred embodiment of the present invention.

FIG. 6 illustrates an example of the control operation to get done by the pulse control section 114. In FIG. 6, illustrated as an example is how the pulse control section 114 performs a phase control on two power generating units 110-1 and 110-2. In this example, the transmission line is supposed to be a copper wire with a diameter of 1.1 mm and with an insulating coating having a thickness of 1.46 mm, f0 is supposed to be 1.8 MHz, the impedance Z is supposed to be 35Ω, and the phase shift per unit length is supposed to be 3.13 deg/m. Also, the transmission line lengths of the first and second power generating units 110-1 and 110-2 are identified by Len1 (*m*) and Len2 (*m*) (where Len1<Len2), respectively. In that case, the phase difference between the respective RF energies supplied from the first and second power generating units 110-1 and 110-2 and combined by the combining section 111 becomes 3.13×(Len2−Len1) deg. The pulse control section 114 applies a trigger to generate a pulse to the second pulse generator 102-2 so that the pulse generated by the second pulse generator 102-2 associated with the second power generating unit 110-2 has a phase lead ΔP=3.13×(Len2−Len1) deg with respect to the pulse generated by the first pulse generator 102-1 associated with the first power generating unit 110-1. As a result, the RF energies that are supplied from the first and second power generating units 110-1 and 110-2 to the combining section 111 are already in phase with each other. In response, the combining section 111 combines together the in-phase RF energies that have been supplied from the respective power generating units and then outputs the combined RF energy to the power converting section 112.

In the preferred embodiment described above, the pulse control section 114 is supposed to control the timings of switching so that the time for the second pulse generator 102-2 to generate a pulse is changed by reference to the time for the first pulse generator 102-1 to generate a pulse. However, any of those power generating units 110 may be used as a reference. In any case, the control just needs to be carried out so that the RF energies output by those power generating units 110 that are connected in parallel with each other are in phase with each other when combined with each other.

Optionally, the RF energies supplied from those power generating units may be slightly out of phase with each other when input to the combining section 111. Naturally, it is ideal that those energies are quite in phase with each other. However, the effects of this preferred embodiment can also be achieved as long as the pulse generating timings of the respective pulse generators are adjusted so that the RF outputs being combined have a reduced phase difference between them. In this description, if two energies are in phase with each other, then the absolute value of their phase difference should be 3 deg or less.

Figure 7:
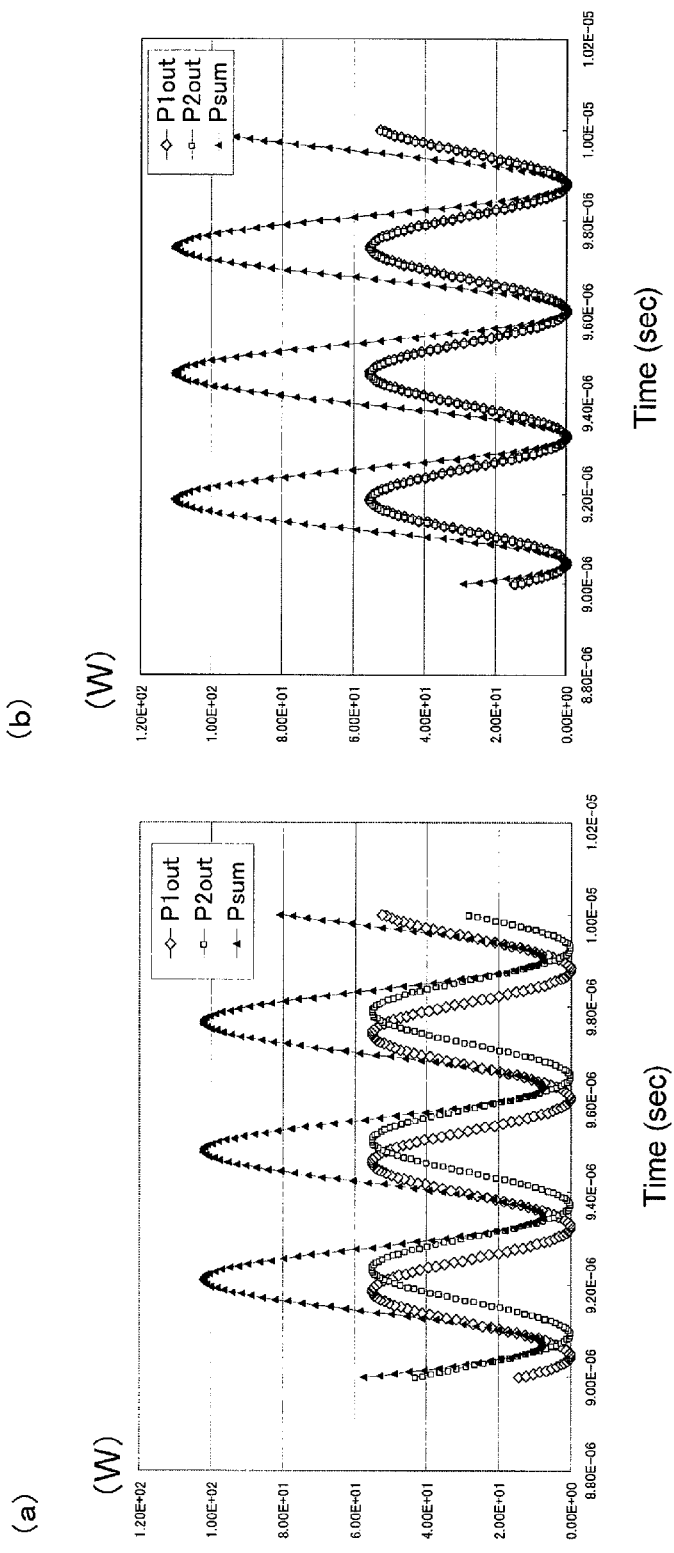
FIGS. 7(a) and 7(b) show how the output powers changed in a situation where the phase control of the first preferred embodiment of the present invention was not carried out and in a situation where that phase control was carried out, respectively.

FIG. 7 shows, based on the results of simulations, how effective the power generation system of this preferred embodiment can be. Specifically, FIG. 7 shows the waveforms of the respective RF outputs that had been supplied from the two power generating units 110-1 and 110-2 and that were being combined by the combining section 111 and also shows the waveform of the combined RF output. The results shown in FIG. 7(*a*) were obtained in a situation where the phase control described above was not performed. On the other hand, the results shown in FIG. 7(*b*) were obtained in a situation where the phase control described above was performed. In FIG. 7, the curves P1out and P2out represent the power waveforms of the RF outputs of the first and second power generating units 110-1 and 110-2, respectively, while the curve Psum represents the output power waveform of the combining section 111.

Those simulations were carried out on the transmission lines under the same condition as what has been described above. Specifically, the first and second power generating units 110-1 and 110-2 had the transmission line lengths of 1 m and 11 m, respectively, a copper wire with a diameter of 1.1 mm and with an insulating coating having a thickness of 1.46 mm was used as the transmission lines, f0 was 1.8 MHz, the peak powers output by the two oscillators 102-2 and 102-2 were 61.4 W (25.6 V, 2.4 A), and the pass characteristics of the wireless transmission section 103 included an input impedance of 10Ω, an output impedance of 35Ω and a transfer efficiency of 94.5%. In that case, the output of the combining section 111 was 102.3 W unless the phases were controlled based on the difference in transmission line length and was 110.3 W when the phases were controlled. Consequently, it was discovered that if the difference in transmission line length was 10 m, the phase control could increase the peak value of the power transmitted by about 8%.

The power converting section 112 converts the RF energy that has been combined as described above into either DC power or AC power with a lower frequency (e.g., 60 Hz or less) than the RF energy according to the specification of the load and then outputs the converted DC or AC power to a load or a utility grid. Optionally, the combined RF energy that has been output by the combining section 111 may be used as it is without being converted by the power converting section 112. For example, the RF output of the combining section 111 may be passed to the power transmitting antenna of a wireless power transmission system that has the same resonant frequency f0 but that uses a different magnetic resonant coupling method (such as a system for charging and supplying power to an electric car).

As described above, even if the transmission line length varies from one power generating unit 110 to another when energy is transferred by a non-contact method, the power generation system of this preferred embodiment can still extract the maximum power from the power generating device 101. Furthermore, when output to a utility grid or a load, the power can have its voltage increased to any required level. As a result, a power generation system that can be installed at a reduced cost, that can have any deteriorated part of the power generating module replaced easily, and that does not need any extra voltage boosting device is realized.

The power generator of this preferred embodiment can raise the output voltage of the power converting section 112 to the range of 200 V to 300 V, for example. If necessary, it can also be raised to the range of 300-400 V as required by a normal power conditioner or DC power supply system or to an even higher level, too.

Figure 8:
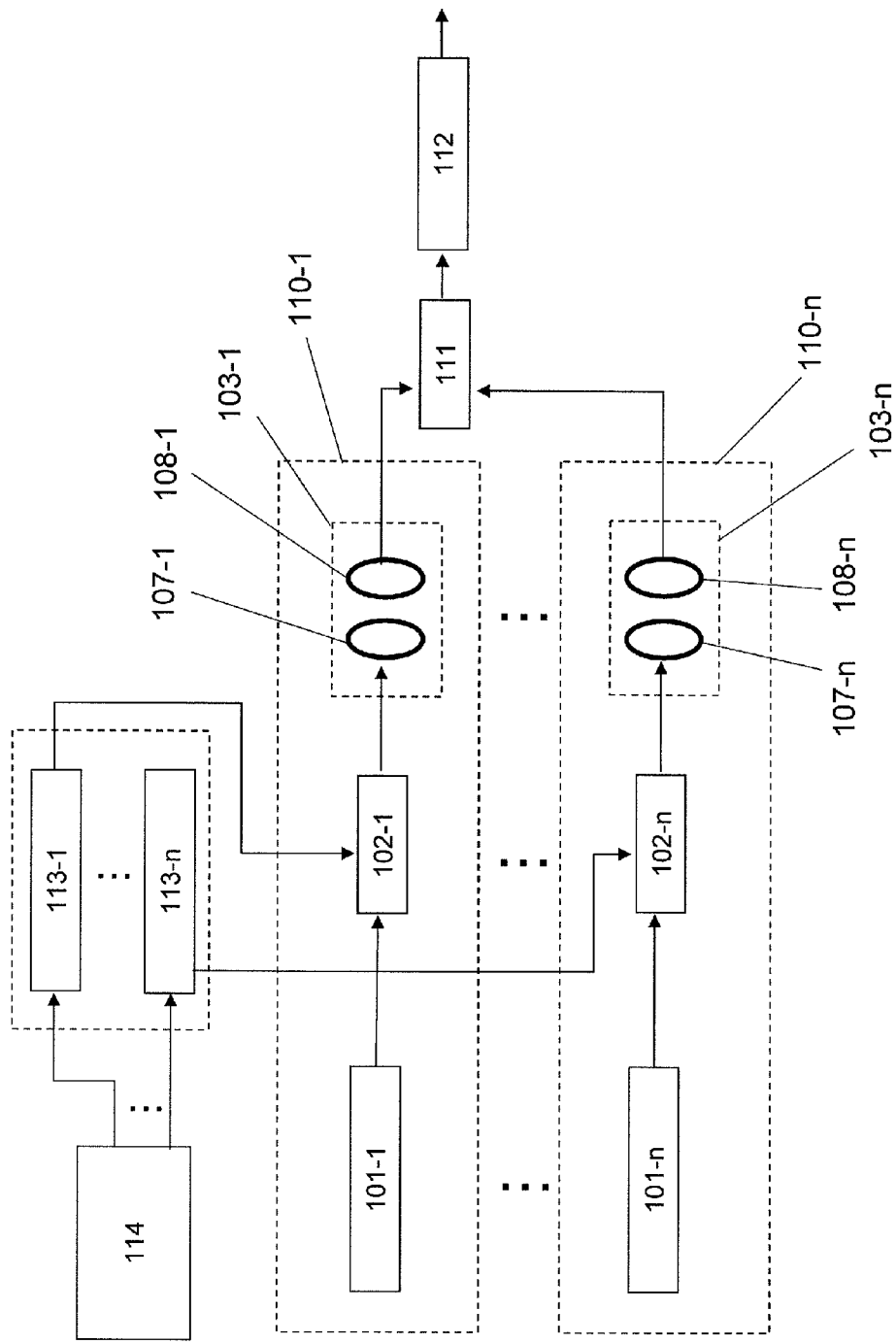
FIG. 8 illustrates an alternative arrangement for a power generation system according to the first preferred embodiment of the present invention.

In the preferred embodiment described above, each power generating unit 110 is designed so as to include a pulse generator 113. However, the pulse generator 113 may also be arranged separately from the power generating unit 110. FIG. 8 illustrates an example of such an arrangement. In the arrangement illustrated in FIG. 8, n pulse generators 113-1, . . . and 113-$n$ are put together in a single housing and arranged separately from the respective power generating units 110. Even with such an arrangement adopted, as long as a pulse is generated at the best timing that has been determined with a variation in transmission distance from each pulse generator 113 to its associated oscillator 102 taken into account, the phase of the RF energy output by the oscillator 102 can also be controlled appropriately.

Also, in the preferred embodiment described above, the phase is controlled using the pulse control section 114 and the multiple pulse generators 113-1, . . . and 113-$n$. However, the phase may also be controlled by any other method. For example, instead of using the pulse control section 114 and the pulse generators 113, the reactance control circuit 130 shown in FIG. 2 may be inserted onto the transmission line. The reactance control circuit 130 may be an LC circuit including an inductor and a capacitor, for example, and may be connected either between the oscillator 102 and the power transmitting antenna 107 or between the power receiving antenna 108 and the combining section 111. By using such a reactance control circuit 130, of which the inductance and/or capacitance have been set appropriately, the RF energy to be transmitted can have the intended phase. As a result, the phase difference between the RF energies being combined can be further reduced.

Embodiment 2

Next, a second preferred embodiment of the present invention will be described with reference to FIG. 9.

The power generation system of this preferred embodiment can match the respective impedances of its circuit blocks to each other according to a variation in the output impedance of the power generating device 101, which is a major difference from the power generation system of the first preferred embodiment described above. Thus, the following description of this second preferred embodiment will be focused on the differences from the power generation system of the first preferred embodiment and their common features will not be described all over again to avoid redundancies.

If the power generating device 101 is a solar cell, the output impedance of the power generating device 101 may vary according to some environmental condition such as the intensity of the sunlight that irradiates the cell and the temperature of the cell itself. For that reason, if a fixed load is driven by a solar cell, mismatch may be caused between the output impedance of the cell and the impedance of the transmission line due to a variation in the intensity of the sunlight received or the temperature of the cell itself. As a result, the power transmission efficiency will decrease.

Likewise, even if the power generating device 101 is a fuel cell, the output impedance of the power generating device 101 also varies according to some environmental condition on that power generating device 101. Specifically, the output impedance of the power generating device 101 may vary with the pressure of hydrogen gas injected or the temperature of the cell. That is why in that case, the impedances of the transmission line should be matched by converting the input and output impedances of the transmission line.

However, if the impedances are changed, the reactance values of circuit blocks, of which the impedances have been changed, will ordinarily change, too, and the phase of the RF energy to be transmitted will shift. As a result, the phases of the respective RF energies supplied from the power generating units 101 to the point of combination are different from what they were before the impedances are changed. The power generation system of this preferred embodiment can appropriately control the phases of the respective RF outputs of the power generating units 110 that have shifted due to such a change of impedances.

Figure 9:
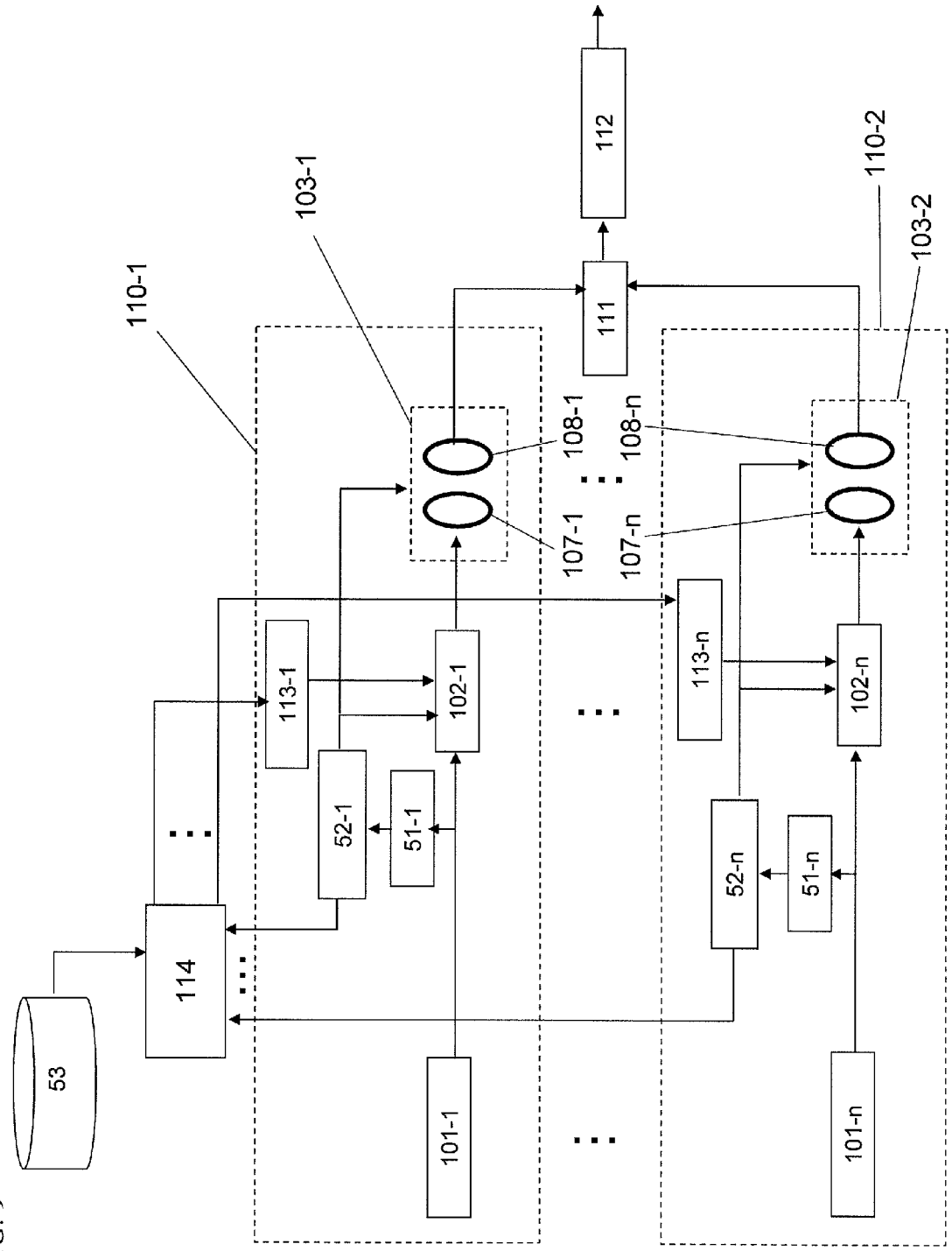
FIG. 9 illustrates an arrangement for a power generation system according to a second preferred embodiment of the present invention.

FIG. 9 illustrates an arrangement for a power generation system as a second preferred embodiment of the present invention. The power generation system of this preferred embodiment includes not only every element of the first preferred embodiment described above but also measuring sections 51, each of which measures the output current and voltage of its associated power generating device 101, and impedance control sections 52, each of which controls the input and output impedances of the respective circuit blocks on its associated transmission line. The power generation system further includes a phase shift data memory 53, which stores information about the estimated phase shift that would have been caused in the RF output due to the change of impedances.

Each impedance control section 52 changes the impedances based on the output impedance value of its associated power generating device 101. The phase shift data memory 53 of this preferred embodiment stores data representing the correlation between a variation in the output impedance of the power generating devices 101 and the magnitude of the phase shift of the RF energy that has been caused as a result of the change of impedances that has been made to cope with that variation.

Hereinafter, it will be described how the power generation system of this preferred embodiment performs the impedance matching operation.

First of all, in each power generating unit 110, the DC energy generated by the power generating device 101 is supplied to the oscillator 102. The measuring section 51 measures the output current and voltage of the power generating device 101 and sends results of the measurements to the impedance control section 52. In response, based on the current and voltage values provided, the impedance control section 52 calculates the output impedance of the power generating device 101 and changes the impedances of the respective circuit blocks on the transmission line into preset values according to the output impedance value calculated so as to achieve as high a transfer efficiency as possible. More specifically, according to a variation in the output impedance of the power generating device 101, the impedance control section 52 changes the input impedance of the oscillator 102 of its associated power generating unit 110, the input impedance of the power transmitting antenna 107 and the output impedance of the power receiving antenna 108 into the best values.

Figure 10:
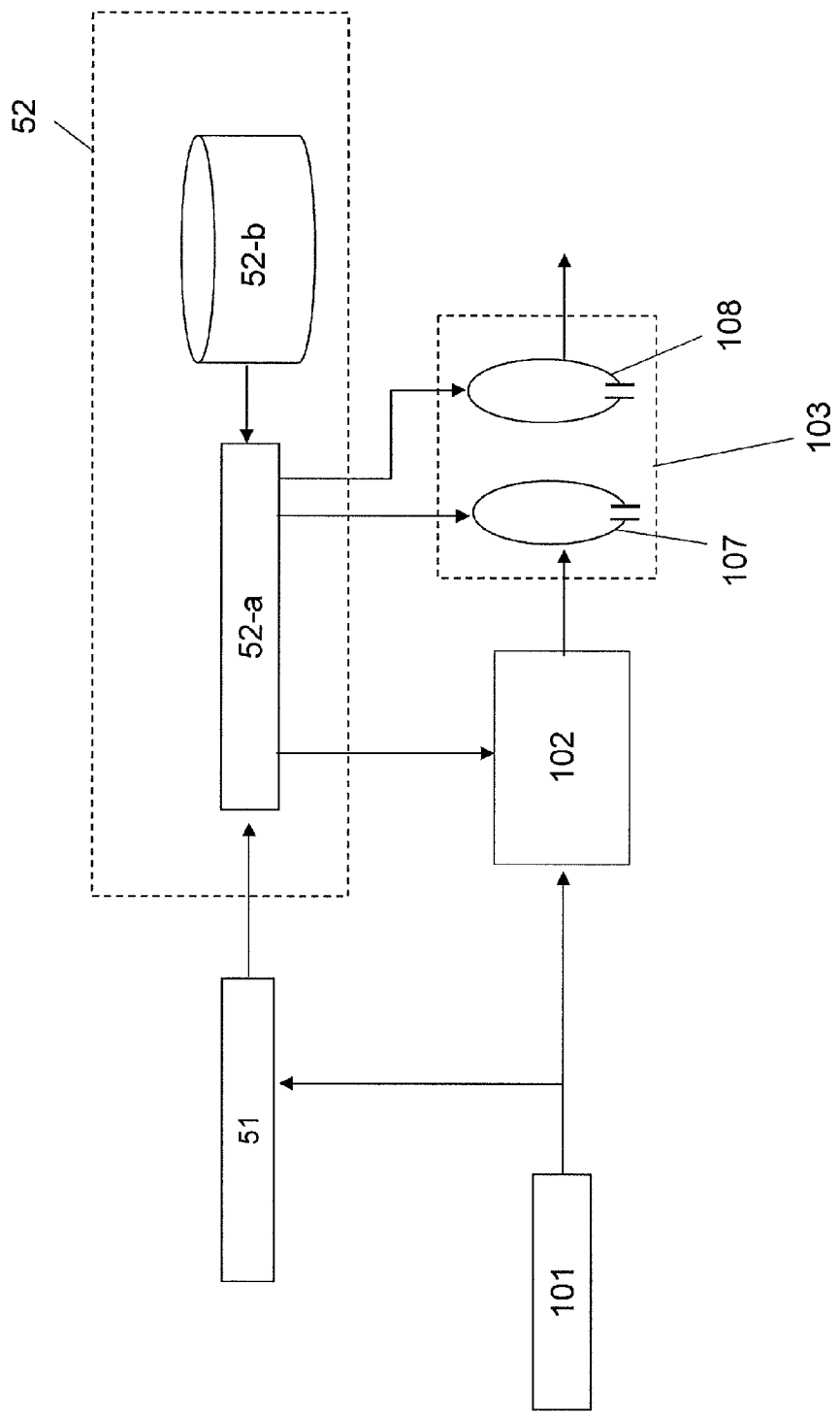
FIG. 10 illustrates an exemplary arrangement for an impedance control section according to the second preferred embodiment of the present invention.

FIG. 10 illustrates an exemplary arrangement for the impedance control section 52. As shown in FIG. 10, the impedance control section 52 includes a switching control section 52a, which changes the input impedance of the device on the receiving end, and an impedance correspondence table 52b, which stores data to be referred to when the input impedance of the device on the receiving end needs to be changed according to a variation in the output impedance of the power generating device 101. In this case, the "device on the receiving end" refers to the oscillator 102, the power transmitting antenna 107 or the power receiving antenna 108. The impedance correspondence table 52b may be stored in a memory (not shown), for example. In this preferred embodiment, each of the oscillator 102, power transmitting antenna 107 and power receiving antenna 108 has multiple switches for use to perform the impedance control. Thus, by changing the combination of the ON and OFF states of the respective switches in each functional section, the impedance of that functional section can be changed. On the impedance correspondence table 52b, determined in advance during the design process and recorded is the correspondence between the range of the output impedances of each power generating device 101 and the combination of the ON and OFF states of the respective switches at the functional section on the receiving end. The impedance correspondence table 52b may be the following Table 1, for example:

TABLE 1

| Output impedance of power generating device | Q1 of oscillator | Q2 of oscillator | Q3 of oscillator |
| --- | --- | --- | --- |
| Z ≤ Z1 | ON | OFF | OFF |
| Z1 < Z ≤ Z2 | OFF | ON | OFF |
| Z2 < Z | OFF | ON | ON |

Although only the ON/OFF states of the switches Q1 to Q3 of the oscillator 102 are shown in this Table 1, the actual table naturally stores data about the switches of the power transmitting antenna 107 and power receiving antenna 108, too. Anyway, this Table 1 indicates that the ON/OFF states of the switches of the oscillator can be changed according to the range of the output impedances Z of the power generating device 101.

Figure 11:
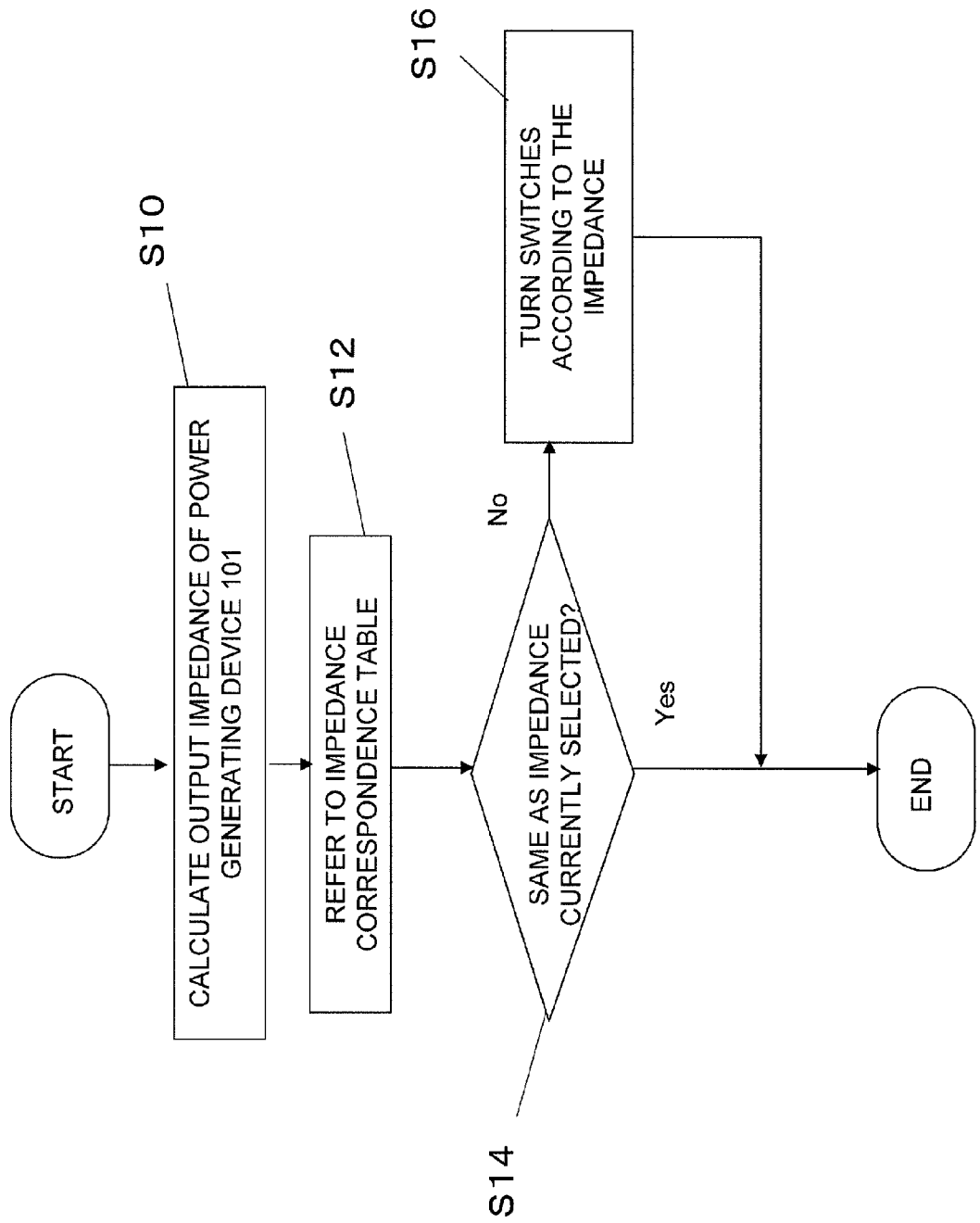
FIG. 11 is a flowchart showing the procedure of an impedance matching process according to the second preferred embodiment of the present invention.
Figure 12:
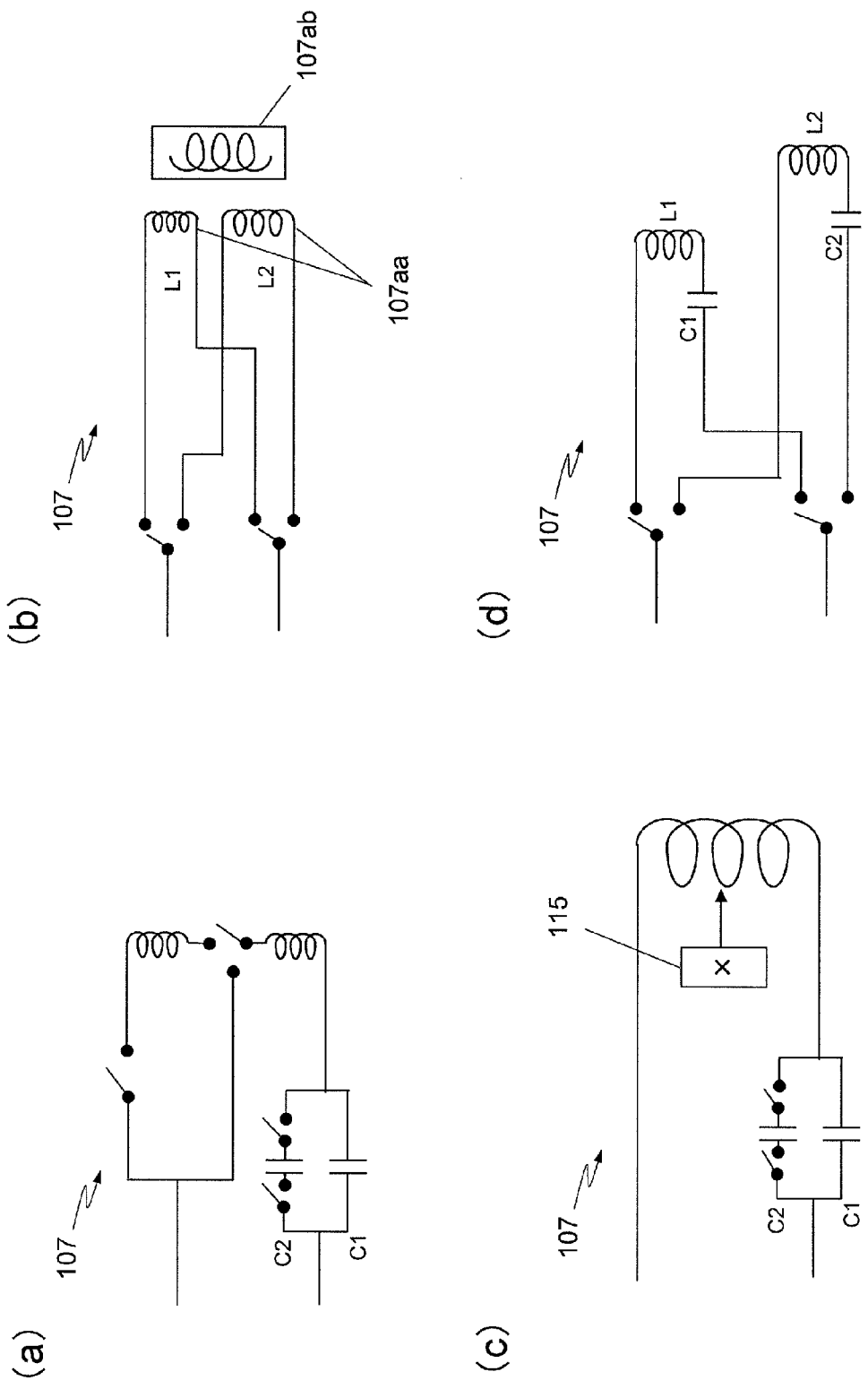
FIGS. 12(a) through 12(d) illustrate four different configurations for a power transmitting antenna according to the second preferred embodiment of the present invention.

FIG. 11 is a flowchart showing the procedure of the impedance matching process of this preferred embodiment. First of all, based on the current (I) and voltage (V) that have been measured by the measuring section 51, the impedance control section 52 calculates the output impedance Z of the power generating device 101 (i.e., Z=V/I). Next, based on the Z value thus calculated, the impedance control section 52 refers to the impedance correspondence table 52b to choose the appropriate combination of the ON/OFF states of the switches for each device on the receiving end. If the impedance associated with the combination thus chosen turns out to be different from the impedance currently selected, the ON/OFF states of the switches of that device on the receiving end are changed in accordance with the combination. On the other hand, if the impedance associated with the combination thus chosen turns out to be the same as the impedance currently selected, the ON/OFF states of the switches are not changed.

The processing by the impedance control section 52 shown in FIG. 11 may be started either at regular time intervals or when a variation in the output impedance of the power generating device 101 reaches a predetermined level. By performing such a control, the respective impedances of the oscillator 102 that follows the power generating device 101, the power transmitting antenna 107, and the power receiving antenna 108 can be matched to the output impedance of the power generating device 101. In this manner, by matching the input impedances of the respective functional sections to the output impedance of the power generating device 101, which varies according to the environmental condition, the maximum output power can always be extracted from the power generating device 101.

In this description, if two impedances are "matched to each other", then the impedances may naturally be exactly matched to each other but could also be just roughly equal to each other. Specifically, if the difference between the greater and smaller impedances is within 25% of the greater one, then those two impedances will also be regarded herein as being "matched to each other".

Specifically, the impedance may be changed by the following method, for example. First of all, as for the oscillator 102, one of multiple oscillator circuits, which have mutually different input impedances, may be selectively connected to the power generating device 101 but as the output impedance of the power generating device 101 varies, the oscillator circuits to connect may be changed into a different one by the switching control section 52a.

On the other hand, as for the power transmitting antenna 107 and the power receiving antenna 108, any of the following four methods may be used. It should be noted that as the same method is applicable to both the power transmitting and power receiving antennas 107 and 108, it will be described how to change the impedances only for the power transmitting antenna 107.

FIG. 12(a) illustrates an example of an impedance changing method for the power-transmitting antenna 107. In this example, the power-transmitting antenna 107 includes multiple inductors, which are connected in series together, and multiple capacitors, which are connected in series to those inductors. This circuit has a number of switches, which are turned by the impedance control section 52 according to the output impedance value of the power generating device 101. In this manner, the impedance control section 52 changes the input impedance of the power-transmitting antenna 107 in accordance with a variation in the output impedance of the power generating device 101.

FIG. 12(b) illustrates another example of an impedance changing method for the power-transmitting antenna 107, which includes multiple inductors 107aa, which have mutually different inductances and which are connected in parallel with each other, and another inductor 107ab, which is arranged near these inductors. This is a configuration including a passive circuit for transmitting electric power from one of those inductors 107aa to the inductor 107ab based on the principle of electromagnetic induction. According to this method, by changing the inductors 107aa to pass the current, the inductance formed by the inductors 107aa and 107ab and the capacitance between the inductors 107aa and 107ab vary, and therefore, the impedance can be changed. The impedance control section 52 chooses one of the multiple inductors 107aa according to the output impedance value of the power generating device 101 and turns the switches so that current flows through the inductor 107aa chosen. In this manner, the impedance control section 52 changes the input impedance of the power-transmitting antenna.

FIG. 12(c) illustrates still another example of an impedance changing method for the power-transmitting antenna 107. In this example, the power-transmitting antenna 107 includes an inductor, multiple capacitors that are connected in series to the inductor, and a movable portion 115 with a metallic or magnetic body. In such a configuration, the capacitance can be changed by bringing a metallic body closer to the inductor and the inductance can be changed by brining a magnetic body closer to the inductor. In this manner, the input and output impedances of the power-transmitting antenna 107 can be changed. Also, even by turning the switches that are connected to the capacitors, the input and output impedances of the power-transmitting antenna 107 can be changed, too. According to the output impedance value of the power generating device 101, the impedance control section 52 not only changes the distance between the inductor and the movable portion but also turns the switches ON or OFF so that current flows through at least one of the capacitors. Consequently, the input impedance of the power-transmitting antenna 107 can be changed in accordance with a variation in the output impedance of the power generating device 101.

FIG. 12(d) illustrates yet another example of an impedance changing method for the power-transmitting antenna 107. In this example, the power-transmitting antenna 107 includes multiple resonators, which have mutually different input impedances and are connected in parallel with each other. When the output impedance of the power generating device 101 varies, the resonators to use are changed. The impedance control section 52 chooses one of those resonators according to the output impedance value of the power generating device 101 and makes current flow through the resonator chosen, thereby changing the input impedance of the power-transmitting antenna 107. In this case, to prevent power from being transmitted to the resonator not to use, that non-chosen resonator is not grounded.

The switching control section 52a of the impedance control section 52 may change the impedance of the power-transmitting antenna 107 by at least one of these four methods described above. As a result, the input impedance of the power-transmitting antenna 107 can be matched to the output impedance of the power generating device 101.

Although the impedance control section 52 preferably changes the impedances of all of the oscillator 102, the power transmitting antenna 107 and the power receiving antenna 108, the impedance control section 52 may also be designed so as to change the impedance of at least one of them.

If the impedances are changed as described above, then the inductances and/or capacitances of the oscillator 102 and the wireless transmission section 103 will generally change, thus causing a phase shift between the input and the output. As described above, the phase shift data memory 53 shown in FIG. 9 stores information about the magnitude of the phase shift involved with the change of impedances. In changing the impedances, the impedance control section 52 provides the pulse control section 114 with information indicating the changed impedance value of each device on the receiving end as defined on the impedance correspondence table 52b. The pulse control section 114 not only receives the information provided by the impedance control section 52 but also retrieves information about the phase shift that has been caused in the RF output of each power generating unit 110 due to the change of impedances from the phase shift data memory 53. And based on the information that has been retrieved from the phase shift data memory 53 and the information about the transmission line length of each power generating unit 110, the pulse control section 114 determines the magnitude of phase shift of the entire power generating unit. After that, the pulse control section 114 instructs the pulse generator 113 associated with each power generating unit 110 exactly when to switch so as to cancel the phase shift of the entire power generating unit. In this manner, the phase of the RF output of each power generating unit 110 can be controlled and the decrease in the output power of the combining section 111 can be minimized as in the first preferred embodiment described above.

As described above, when energy is transferred by a non-contact method using magnetic resonant coupling, the power generation system of this preferred embodiment matches the impedances of respective circuit blocks on the transmission line to each other according to the status of the operating environment, thereby always outputting maximum power from the power generating device. Also, before being output to a utility grid or a load, the power can have its voltage raised to the required level. As a result, a power generation system, which can be installed at a reduced cost, which can have any deteriorated modules thereof readily replaced, and which does not need any voltage boosting device, is realized.

In addition, the power generator of this preferred embodiment can raise the output voltage of the power converting section 112 to the range of 200 V to 300 V, for example. If necessary, it can also be raised to the range of 300-400 V as required by a normal power conditioner or DC power supply system or to an even higher level, too. The input and output impedances of the respective circuit blocks of each power generating unit 110 and the voltage step-up ratio of the power generating unit 110 are preferably defined so that the power converting section 112 can have such a high output voltage.

In the preferred embodiment described above, the phase shift is supposed to be canceled in every power generating unit 110-1, . . . and 110-n. However, the power generation system of the present invention may also be designed so that the phase difference between the RF energies being combined can be reduced in at least two power generating units 110-1 and 110-2. For example, the phase shift data memory 53 may store information indicating how the magnitude of the phase shift when the respective RF outputs of the at least two power generating units 110-1 and 110-2 are combined together changes as the output impedances of the power generating devices 101-1 and 101-2 of the power generating units 110-1 and 110-2 vary. In that case, the oscillation phase control section 120 (which is formed of the pulse control section 114 and the pulse generators 113-1, . . . and 113-n according to this preferred embodiment) may be designed so as to control the phase difference between the RF energies supplied from the oscillators 102-1 and 102-2 of the two power generating units 110-1 and 110-2 by reference to the information stored in the phase shift data memory 53.

The impedance matching and phase control do not always have to be done by the methods described above but may be carried out in various other ways. For example, the impedance matching may also be done by putting a thermometer or a light meter in the vicinity of each power generating device 101 and by estimating the output impedance of the power generating device 101 based on the measurement data obtained by the thermometer or light meter instead of using the measuring section 51 described above. As for the phase control, on the other hand, the magnitude of phase correction to make with a variation in the output impedance of each power generating device 101 may be calculated in accordance with a program that has been preinstalled in the pulse control section 114 without using the phase shift data memory 53 described above.

In the power generation system of the preferred embodiment described above, the phase is controlled by using the pulse control section 114 and the pulse generators 113 as the oscillation phase control section 120. However, the phase may also be controlled by any other method. For example, the phase may also be controlled by setting the reactance value of the device on the receiving end to be such a value that can minimize the phase shift of the RF energy to be transmitted (i.e., will cause a phase shift of 360 degrees on the RF energy) when the impedance control section 52 changes the impedances as described above.

Optionally, the power generation system of this preferred embodiment can also control the phase of each RF output by inserting the reactance control circuit 130 shown in FIG. 2 onto the transmission line without using the pulse control section 114 or the pulse generators 113. By selecting circuits, of which the inductances and/or capacitances have been set appropriately, the phase difference between the RF energies being combined together can be reduced.

Comparison with the Prior Art

Hereinafter, the effects to be achieved by the power generation system of this preferred embodiment will be described in comparison with a conventional power generation system.

In the apparatus disclosed in United States Patent Application Publication No. 2008/0278264, energy is transferred between two magnetic resonators. However, as that apparatus uses the same resonance method for the two resonators, the voltage is not increased while the energy is transferred. On the other hand, the increase in output voltage caused by the power generation system of the present invention is an effect that has never been produced by that conventional apparatus and that is produced solely by adopting two different resonance structures, i.e., a series magnetic resonance structure and a parallel magnetic resonance structure, for the power-transmitting and power-receiving antennas 107 and 108, respectively, and by transferring energy between those two different resonance structures.

It should be noted that a series resonant circuit and a parallel resonant circuit could also be used in a conventional RF telecommunications system such as an RF tag. However, the terminal impedance at the terminal of a probe for use to test the characteristic of an RF block of such an RF telecommunications system and the characteristic impedance of its RF cable are basically set to be 50Ω. That is why at a point of connection with an antenna of such an RF telecommunications system, circuit blocks are normally connected together with the impedance matched to 50Ω in both of its transmitter and receiver.

On the other hand, in the wireless transmission section of this preferred embodiment, the input to output impedance conversion ratio Zr is defined to be as high as over 100 or sometimes more than 20000 depending on the conditions. And that high input to output impedance conversion ratio Zr would never have been imagined to be achievable by the conventional RF telecommunications system.

On top of that, according to this preferred embodiment, the longer the distance between the two resonators (or antennas) and the lower the coupling coefficient k, the higher the voltage step-up ratio Vr achieved will be. This is also an effect that would never have been easily expected from the structure and functions of the wireless transmission section for a known telecommunications system.

In a transformer for use in a power circuit, for example, two inductors are arranged close to each other so as to function as a sort of wireless power transmission system. However, no magnetic resonant coupling is produced between those inductors. Also, such a transformer could achieve the voltage increase effect by increasing the ratio of the number of turns N2 of the second inductor to the number of turns N1 of the first inductor. However, if the transformer booster has to achieve a voltage step-up ratio of 10 or more, then the number of turns N2 should be increased at least tenfold with respect to the number of turns N1. Such a significant increase in the number of turns N2 would increase the parasitic resistance component R2 in the second inductor proportionally, thus causing a decrease in transmission efficiency after all. In contrast, according to the present invention, even if the numbers of turns N1 and N2 are the same, a high Zr can still be achieved.

The power generation system of the present invention can reduce the installation cost, and therefore, is applicable to a solar power generation system or full cell power generation system to be installed on a wall of a building or at a height.

While the present invention has been described with respect to preferred embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

What is claimed is:

1. A power generation system comprising:
   first and second power generating units, each of which includes: a power generating device that outputs DC energy; an oscillator that converts the DC energy supplied from the power generating device into RF energy having a frequency f0 and that outputs the RF energy; a power transmitting antenna that transmits the RF energy supplied from the oscillator; and a power receiving antenna that receives at least a part of the RF energy that has been transmitted by the power transmitting antenna, the resonant frequencies of the power transmitting and power receiving antennas being set to be equal to the frequency f0, the power generating unit outputting the RF energy that has been received by the power receiving antenna;
   a combining section that receives and combines the RF energies supplied from those power generating units and outputs combined RF energy; and
   an oscillation phase control section that controls the oscillators belonging to the first and second power generating units to control a phase difference between the RF energies supplied from the oscillators belonging to the first and second power generating units, respectively, so that first and second RF energies supplied from the first and second power generating units are in phase with each other prior to being combined together by the combining section.

2. The power generation system of claim 1, wherein in each said power generating unit, the power transmitting antenna is a series resonant circuit and the power receiving antenna is a parallel resonant circuit.

3. The power generation system of claim 1, wherein the oscillation phase control section includes:
  a first pulse generator, which generates a pulse that defines the phase of the RF energy supplied from the oscillator belonging to the first power generating unit and which applies the pulse to that oscillator;
  a second pulse generator, which generates a pulse that defines the phase of the RF energy supplied from the oscillator belonging to the second power generating unit and which applies the pulse to that oscillator; and
  a pulse control section, which instructs the first and second pulse generators exactly when to generate the pulse.

4. The power generation system of claim 1, wherein the phase difference between the RF energies supplied from the oscillators belonging to the first and second power generating units, respectively, has been set based on a difference in the length of a transmission line from the power receiving antenna to the combining section between the first and second power generating units.

5. The power generation system of claim 1, wherein each said power generating unit includes an impedance control section, which changes at least one of the input impedance of the oscillator, the input impedance of the power transmitting antenna and the output impedance of the power receiving antenna according to a variation in the output impedance of the power generating device, and
  wherein the oscillation phase control section controls a phase difference between the RF energies supplied from the oscillators belonging to the first and second power generating units, respectively, so that if the impedance control section has changed at least one of the input impedance of the oscillator, the input impedance of the power transmitting antenna and the output impedance of the power receiving antenna, the first and second RF energies are in phase with each other when combined together by the combining section.

6. The power generation system of claim 5, wherein each said power generating unit includes a measuring section for measuring the output current and output voltage of its power generating device, and
  wherein the impedance control section detects the output impedance value of the power generating device based on the output current and output voltage that have been measured by the measuring section.

7. The power generation system of claim 5, comprising a phase shift data memory that stores information indicating how the magnitude of a phase shift between the first and second RF energies being combined by the combining section changes as the output impedance of the power generating device of each said power generating unit varies,
  wherein the oscillation phase control section controls the phases of the RF energies supplied from the oscillators belonging to the first and second power generating units, respectively, by reference to the information that is stored in the phase shift data memory so that those energies are in phase with each other.

8. The power generation system of claim 1, comprising a power converting section that converts the output of the combining section into either DC or AC energy with a frequency of 60 Hz or less and then outputs the DC or AC energy.

9. The power generation system of claim 8, wherein in each said power generating unit, the respective input impedances of the oscillator and the power transmitting antenna, the output impedance of the power receiving antenna and the voltage step-up ratio of the power generating unit itself are defined so that the power converting section has an output voltage of 200 to 300 V.

10. The power generation system of claim 1, wherein the power generating device belonging to each said power generating unit is a solar power generating device.

11. The power generation system of claim 10, wherein the solar power generating device uses crystalline silicon.

12. The power generation system of claim 10, wherein in each said power generating unit, the power generating device and the power transmitting antenna are arranged outside of a building, and the power receiving antenna is installed inside of the building.

13. The power generation system of claim 10, wherein in each said power generating unit, the power generating device, the power transmitting antenna and the power receiving antenna are arranged outside of a building, and the power transmitting and power receiving antennas are arranged so as to face each other at least partially.

14. The power generation system of claim 1, wherein if in each said power generating unit, the oscillator has a voltage step-up ratio Voc, the power transmitting antenna has an inductance L1, the power receiving antenna has an inductance L2, and the power transmitting and power receiving antennas have a coupling coefficient k,
  each said power generating unit satisfies $(L2/L1) \geq 4(k/Voc)^2$.

15. A power generation system comprising:
  first and second power generating units, each of which includes: a power generating device, which outputs DC energy; an oscillator that converts the DC energy supplied from the power generating device into RF energy having a frequency f0 and that outputs the RF energy; a power transmitting antenna that transmits the RF energy supplied from the oscillator; and a power receiving antenna that receives at least a part of the RF energy that has been transmitted by the power transmitting antenna, the resonant frequencies of the power transmitting and power receiving antennas being set to be equal to the frequency f0, the power generating unit outputting the RF energy that has been received by the power receiving antenna;
  a combining section that receives and combines the RF energies supplied from those power generating units and outputs combined RF energy; and
  a reactance control circuit that is inserted to a transmission line between the oscillator and the power transmitting antenna in at least one of the first and second power generating units, the reactance control circuit including an inductor and/or a capacitor and setting a reactance value so that the first and second RF energies that have been supplied from the first and second power generating units are in phase with each other when combined by the combining section.

16. A power generating unit for use in the power generating system of claim 1, the power generating unit comprising:
  a power generating device that outputs DC energy;
  an oscillator that converts the DC energy supplied from the power generating device into RF energy having a frequency f0 and which outputs the RF energy;
  a pulse generator that generates a pulse that defines the phase of the RF energy supplied from the oscillator and which applies the pulse to that oscillator, the pulse generator including an input section that receives an externally input control signal and generating the pulse in response to the input of the control signal, the control signal being determined so as to make the phase of the RF energy output from the power generating unit be in phase with a phase of RF energy output from another power generating unit in the power generating system;

a power transmitting antenna that transmits the RF energy supplied from the oscillator; and a power receiving antenna that receives at least a part of the RF energy that has been transmitted by the power transmitting antenna, wherein the resonant frequencies of the power transmitting and power receiving antennas are set to be equal to the frequency f0, and wherein the power generating unit outputs the RF energy that has been received by the power receiving antenna.

* * * * *